US008788430B2

(12) United States Patent
Ishii

(10) Patent No.: US 8,788,430 B2
(45) Date of Patent: Jul. 22, 2014

(54) APPARATUS WITH ELECTRONIC INFORMATION TRANSFER FUNCTION OR THE LIKE, PROGRAM FOR ELECTRONIC INFORMATION TRANSFER, AND METHOD FOR ELECTRONIC INFORMATION TRANSFER

(75) Inventor: Kenji Ishii, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1538 days.

(21) Appl. No.: 11/252,827

(22) Filed: Oct. 19, 2005

(65) Prior Publication Data
US 2006/0095384 A1    May 4, 2006

(30) Foreign Application Priority Data
Oct. 28, 2004   (JP) ................... 2004-314138

(51) Int. Cl.
*G06Q 20/00*  (2012.01)
*H04L 9/00*  (2006.01)
*H04L 29/06*  (2006.01)

(52) U.S. Cl.
USPC ............................. 705/76; 380/277; 713/156

(58) Field of Classification Search
USPC ....................................................... 705/1–79
See application file for complete search history.

(56) References Cited

U.S. PATENT DOCUMENTS

| 5,553,145 | A | | 9/1996 | Micali |
| 5,629,980 | A | * | 5/1997 | Stefik et al. ...................... 705/54 |
| 5,666,420 | A | | 9/1997 | Micali et al. |
| 6,212,634 | B1 | * | 4/2001 | Geer et al. ..................... 713/156 |
| 6,983,371 | B1 | * | 1/2006 | Hurtado et al. ............... 713/189 |
| 7,170,999 | B1 | * | 1/2007 | Kessler et al. ................. 380/277 |
| 7,363,361 | B2 | * | 4/2008 | Tewari et al. .................. 709/223 |
| 2001/0014876 | A1 | * | 8/2001 | Miyashita ....................... 705/37 |
| 2002/0059237 | A1 | * | 5/2002 | Kumagai et al. ................. 707/9 |
| 2003/0163431 | A1 | * | 8/2003 | Ginter et al. .................... 705/64 |
| 2004/0024688 | A1 | * | 2/2004 | Bi et al. .......................... 705/37 |
| 2004/0054920 | A1 | | 3/2004 | Wilson et al. |
| 2004/0059644 | A1 | * | 3/2004 | Blau .............................. 705/26 |
| 2004/0147251 | A1 | * | 7/2004 | Nakayama et al. ......... 455/414.2 |
| 2004/0179691 | A1 | * | 9/2004 | Hori et al. ..................... 380/277 |

(Continued)

FOREIGN PATENT DOCUMENTS

EP   1 185 024   3/2002
EP   1 185 024   1/2003

(Continued)

OTHER PUBLICATIONS

PGP Freeware for Windows User's Guide (Version 7.0).*

(Continued)

*Primary Examiner* — Alexander Kalinowski
*Assistant Examiner* — Murali Dega
(74) *Attorney, Agent, or Firm* — Staas & Halsey LLP

(57) ABSTRACT

An information processor transmits and receives electronic information via a network, and includes an electronic information encrypting unit which encrypts the electronic information. A storage unit stores the electronic information and the encrypted electronic information data encrypted by the electronic information encrypting unit. An electronic credit generating unit generates a letter of credit to erase the electronic information from the storage unit and to transmit the encrypted electronic information data to the other information processor. An electronic information communicating unit transmits and receives the encrypted electronic information data and the electronic letter of credit to and from the other information processor.

15 Claims, 15 Drawing Sheets

(56) References Cited

U.S. PATENT DOCUMENTS

| | | |
|---|---|---|
| 2004/0260716 A1 | 12/2004 | Sugiura |
| 2005/0044391 A1* | 2/2005 | Noguchi et al. ............... 713/193 |
| 2005/0144440 A1* | 6/2005 | Catherman et al. ........... 713/156 |
| 2005/0216901 A1* | 9/2005 | Speare et al. ................. 717/168 |
| 2006/0005257 A1* | 1/2006 | Tohru et al. ..................... 726/27 |
| 2006/0224775 A1* | 10/2006 | Lee et al. ....................... 709/248 |
| 2007/0005515 A1* | 1/2007 | Rosenberg ...................... 705/76 |

FOREIGN PATENT DOCUMENTS

| | | |
|---|---|---|
| EP | 1 335 266 | 8/2003 |
| EP | 1 469 406 | 10/2004 |
| JP | 2004-252578 | 9/2004 |
| WO | 03/038704 | 5/2003 |

OTHER PUBLICATIONS

Japanese Office Action for corresponding Japanese Application 2004-314138; dated Mar. 9, 2010.

European Search Report in corresponding Application No. 05256599.1 dated Feb. 13, 2006.

Zhigang, W. et al.; "Research on Merchant Fraud Problem in Electronic Commerce", High Technology Letters, Science Press, Beijing, CN, vol. 5, No. 2, Dec. 1999, pp. 74-80, XP000992436, ISSN: 1006-6748.

* cited by examiner

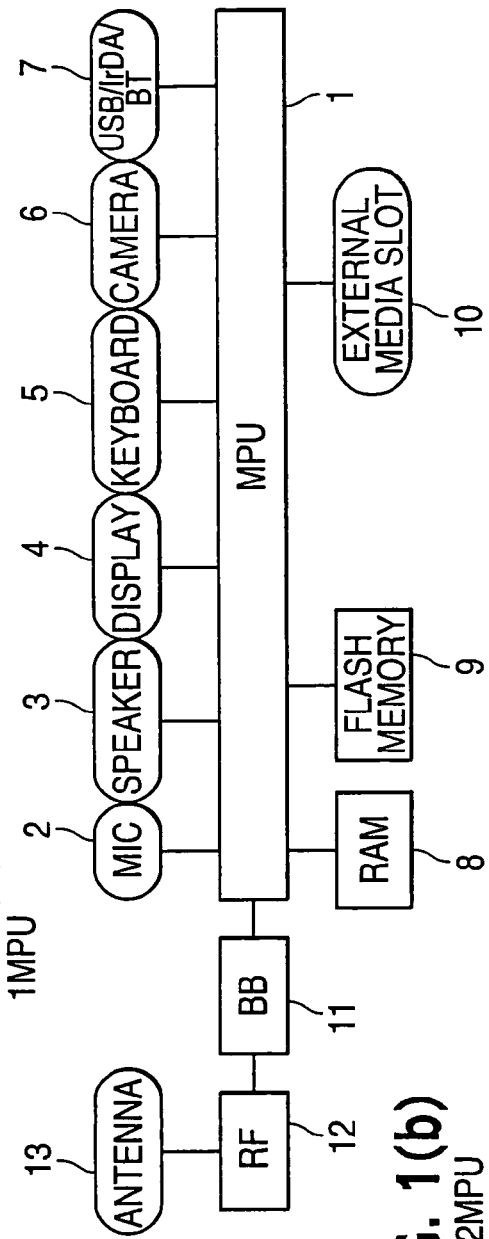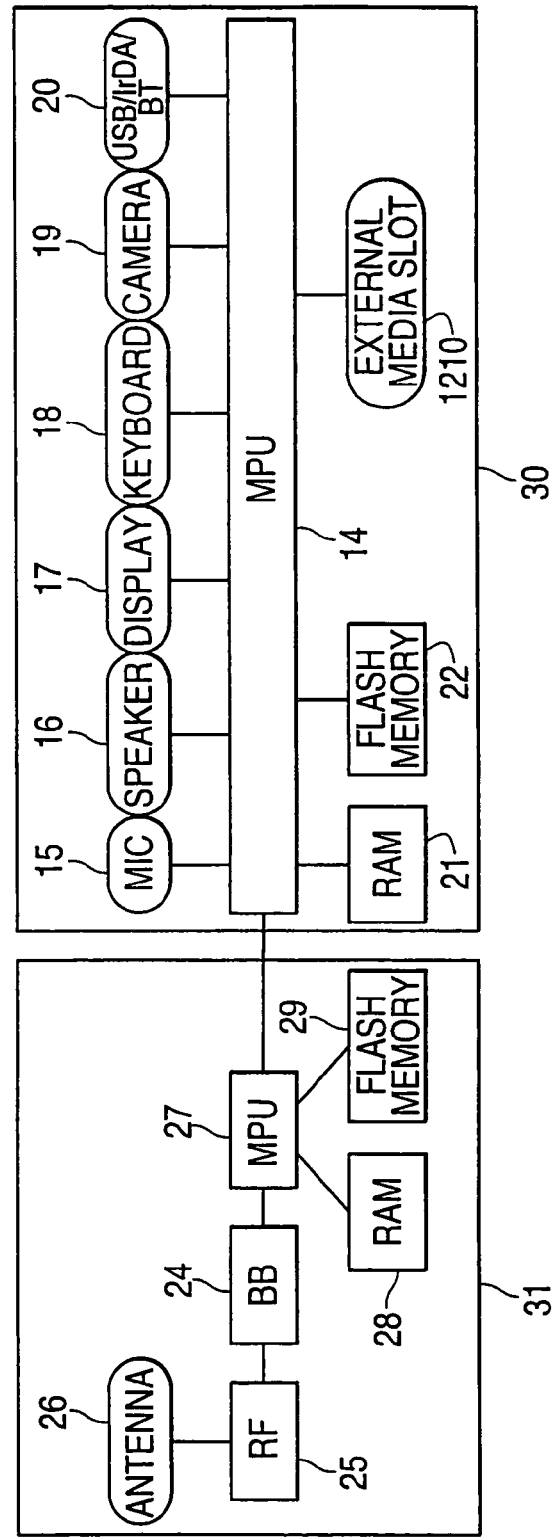

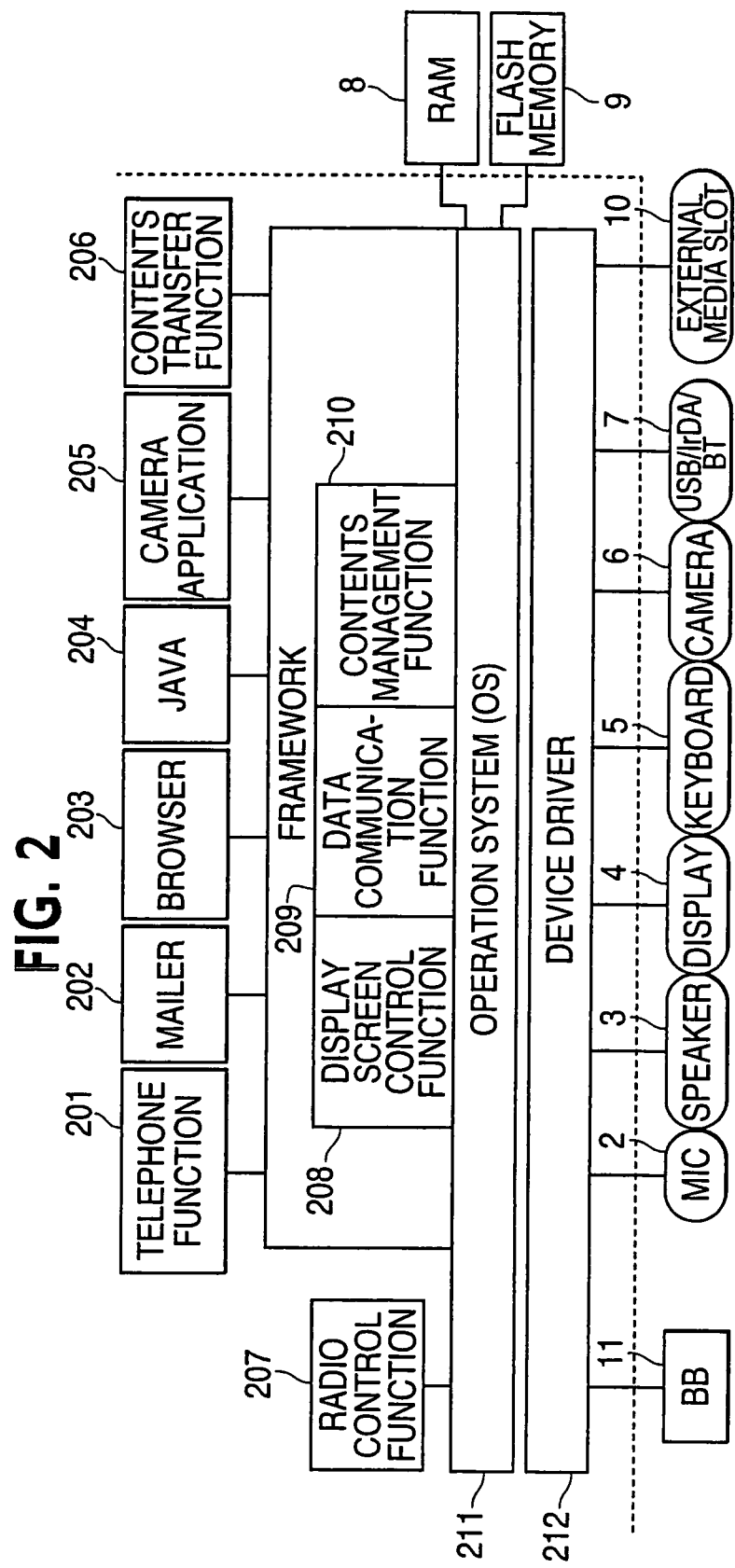

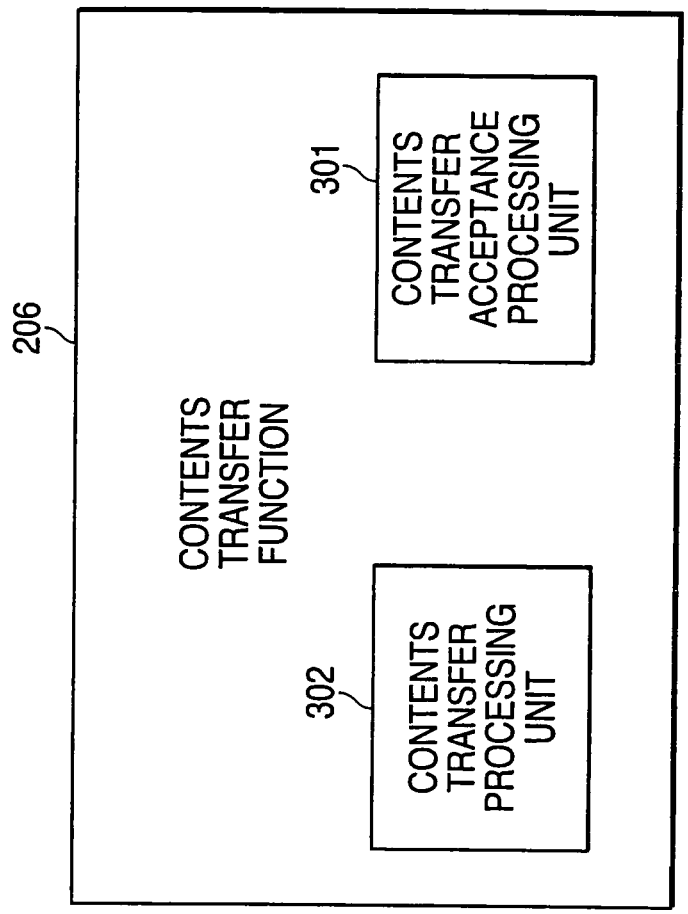

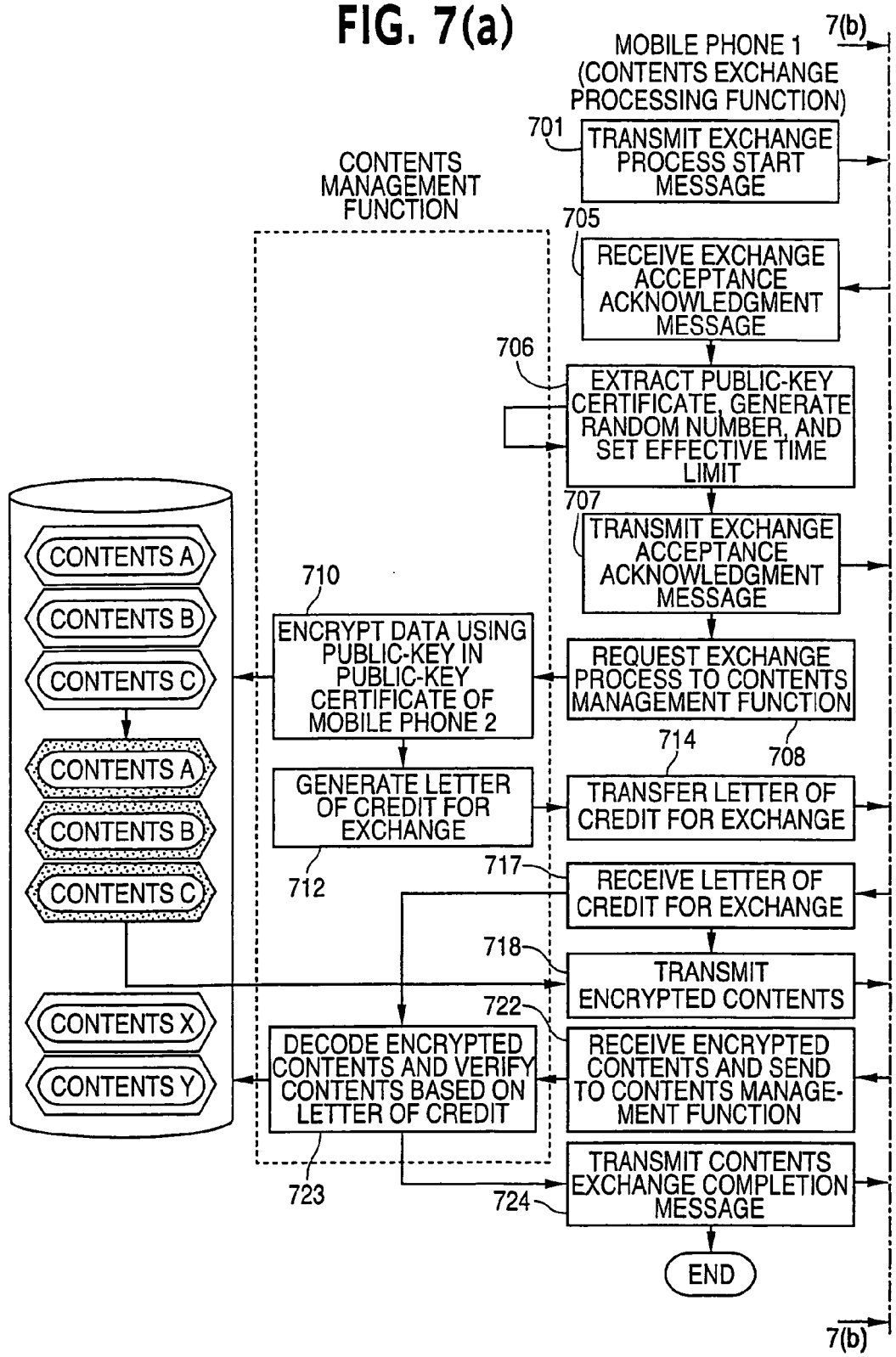

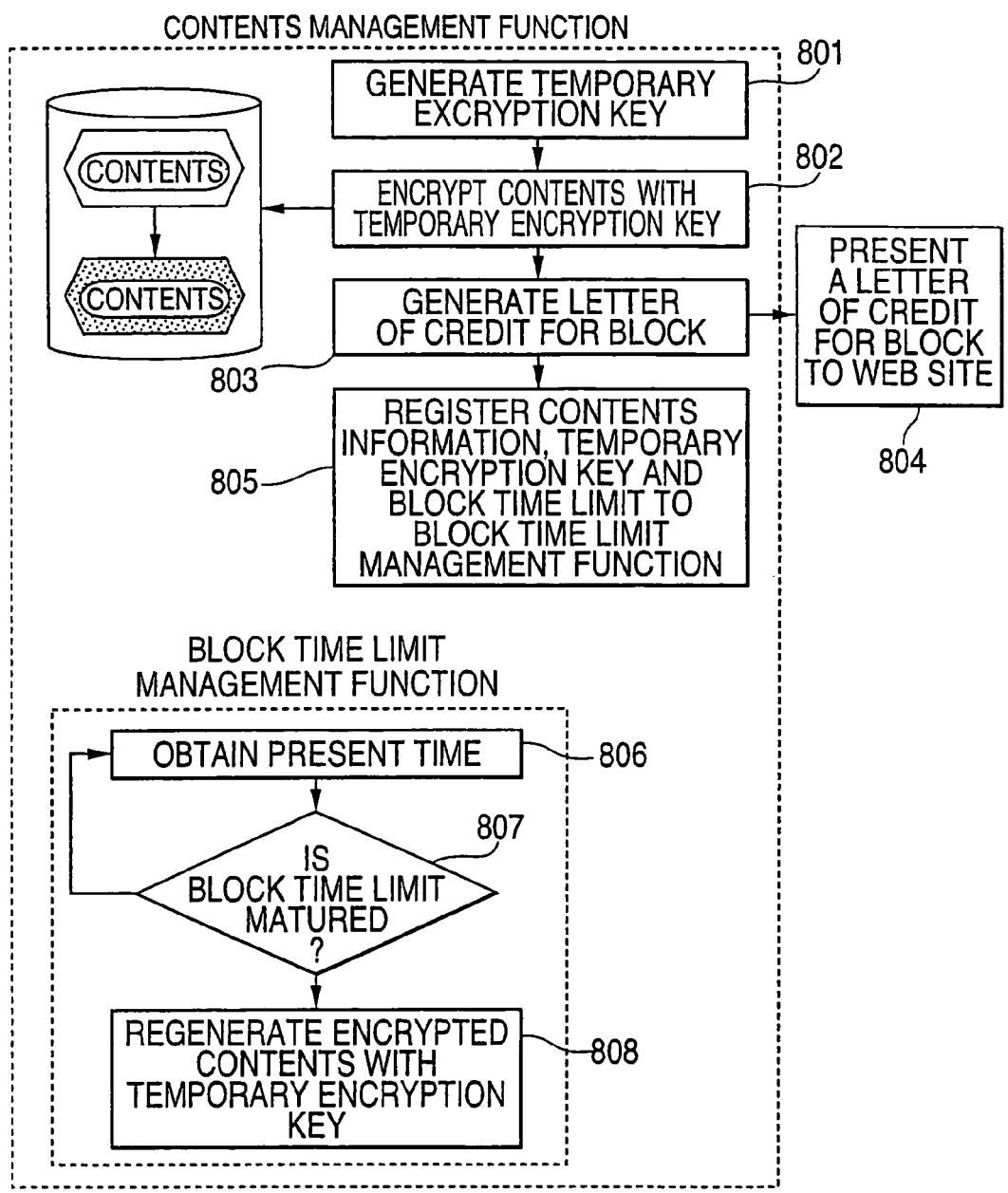

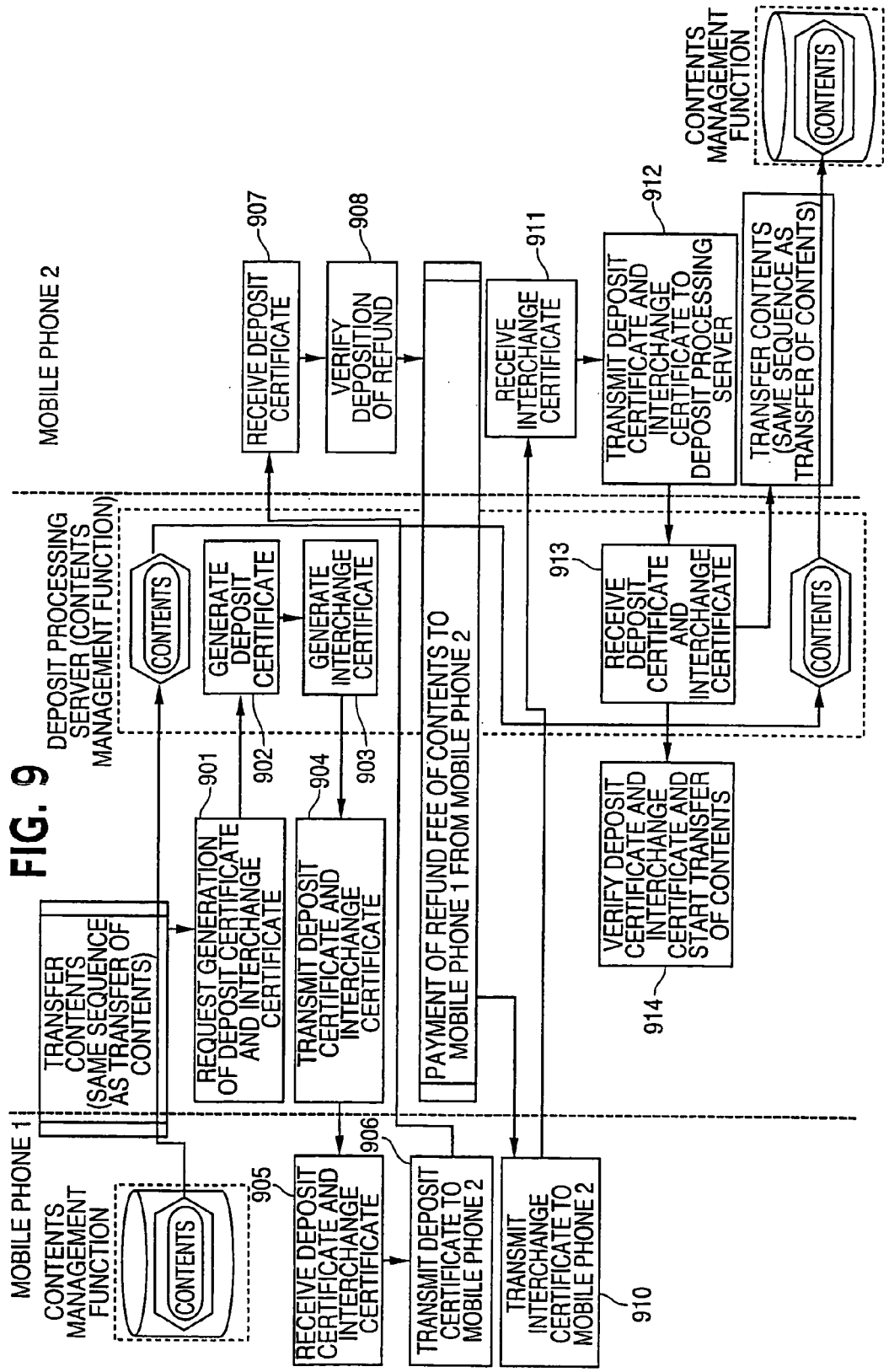

CONTENTS MANAGEMENT FUNCTION

ACKNOWLEDGMENT CODE

| SEQUENCE NUMBER | CONTENTS ID | TIME STAMP | RANDOM NUMBER VALUE | DIGITAL SIGNATURE |
|---|---|---|---|---|

INVALIDATION RESULT DATA

| ACKNOWLEDGMENT CODE | TIME STAMP | DIGITAL SIGNATURE |
|---|---|---|

APPARATUS WITH ELECTRONIC INFORMATION TRANSFER FUNCTION OR THE LIKE, PROGRAM FOR ELECTRONIC INFORMATION TRANSFER, AND METHOD FOR ELECTRONIC INFORMATION TRANSFER

CROSS-REFERENCE TO RELATED APPLICATIONS

This application is related to and claims the benefit of priority to Japanese Patent Application No. 2004-314138, filed Oct. 28, 2004, in Japan, the contents of which are incorporated by reference.

BACKGROUND OF THE INVENTION

1. Field of the Invention

The present invention relates to a method, program and apparatus for transfer or the like of electronic data via networks among information processors.

2. Description of the Related Art

In recent years, electronic data itself has become valuable and this electronic data has often been transferred. Electronic data includes, for example, music data such as MP3 data or the like, call termination melody data such as MIDI or the like, static image data such as JPEG data or the like, dynamic image data such as MPEG4 data or the like, and document data such as text data or the like (hereinafter referred to as "contents").

If no problem occurs on a contract for transferring contents by recording the contents on a storage medium such as a CD-ROM (registered trademark) or the like, contents may be transferred by transferring the storage media or by transferring a code, or the like, indicating the right to use thereof.

However, a problem arises in the transfer, or the like, of contents provided through networks, in that contents are left at a transferor even when contents are transferred to a partner (purchaser). Therefore, for the transfer or the like of contents via such networks, it is required to transfer contents through a reliable system.

Japanese Patent Application Laid-open No. 2001-78266 discloses the conventional transfer or the like of contents among information processors via a network as a means for solving the problem described above.

An apparatus which serves as the transfer destination, obtains an encryption key for decoding of contents from a distribution server at the time the contents are transferred. The contents (e.g., encrypted music data) are distributed via a network to mobile phones from the distribution server. However, the contents are transferred among the mobile phones by recording the contents into memory cards.

However, the conventional means for transferring contents via the network cannot realize a transfer in a local environment such as where infrared rays are used, because the means is formed by three parties via the network. Moreover, such means has a disadvantage in that users may be concerned about reliability because exchanges of contents are administrated by a third party. In addition, the contents are transferred by recording into a memory card among the mobile phones, and the contents are not transferred via the network.

SUMMARY OF THE INVENTION

According to one aspect of the present invention, contents are transferred via a network from one information processor to another information processor, or the like, while users have no concern about the reliability of the transaction when transferring the contents with a letter of credit, or the like.

The information processor of the present invention is an information processor which can transmit and receive electronic information via networks, comprising an electronic information encrypting unit which encrypts the electronic information data, a storage unit which stores the electronic information data and the encrypted electronic information data encrypted in the electronic information encrypting unit, an electronic credit generating unit which generates an electronic letter of credit to erase the electronic information from the storage unit and to transmit the encrypted electronic information data to the other information processor, and an electronic information communicating unit which transmits and receives the encrypted electronic information data and the electronic letter of credit to and from the other information processor.

According to one aspect of the information processor of the present invention, the electronic letter of credit generated by the electronic credit generating unit is given a digital signature of a user transmitting the electronic information.

Another aspect of the information processor of the present invention is that the electronic letter of credit generated by the electronic credit generating unit is given an attribute list of electronic information to be transmitted to the other information processor.

A further aspect of the information processor of the present invention is that an encryption key to be encrypted by the electronic information encrypting unit is the encryption key received from the other information processor to which the electronic information is transferred.

Yet another aspect of the information processor of the present invention is that encryption is performed by the electronic information encrypting unit with the public key encrypting system as the system for encryption, and the electronic information includes the contents information indicating an attribute of the electronic information.

The information processor of the present invention, which can transmit and receive the electronic information via networks, comprises an electronic information encrypting unit which encrypts the electronic information, a storage unit which stores the electronic information and the encrypted electronic information data encrypted by the electronic information encrypting unit, an electronic credit generating unit which generates an electronic letter of credit to erase the electronic information from the storage unit and transmit the encrypted electronic information data to the other information processor, and an electronic information communicating unit which transmits the encrypted electronic information data for the encrypted electronic information data to be received to the other information processor after reception of the electronic letter of credit indicating that the other information processor transmits the encrypted electronic information data to the information processor.

The information processor of the present information, which is connected, via a network, to an electronic information seller from whom the electronic information has been purchased, comprises an electronic information invalidation notifying unit which erases and invalidates the electronic information and requesting refund of the purchasing fee of the electronic information, an erasing and invalidation result information generating unit which receives an acknowledgment code which acknowledges a refund request of the electronic information from the electronic information seller and generates the erasing and invalidation result information indicating completion of the erasing and invalidation of the electronic information on the basis of the acknowledgment code, and an electronic information communicating unit which transmits the erasing and invalidation result information to the electronic information seller.

The electronic information transfer program of the present invention, as a contents transfer program for enabling transfer of electronic information via networks, comprises controlling a computer to execute encrypting the electronic information, generating an electronic letter of credit to erase the encrypted electronic information data and transmit the encrypted electronic information data to the other processor, and transmitting and receiving the encrypted electronic information data and the letter of credit to and from the other processor.

The contents transfer method of the present invention for enabling transfer of electronic information via networks comprises encrypting the electronic information, generating an electronic letter of credit to erase the encrypted electronic information data and transmit the encrypted electronic information data to the other processor, and transmitting and receiving the encrypted electronic information data and the letter of credit to and from the other processor.

According to an aspect of the information processor of the present invention, since a first party, for example, can prove that a valid transfer of contents occurred from a letter of credit for that transfer, when a second party, for example, who has purchased the contents from the first party receives the letter of credit for the transfer from a transferor, transfer of contents through the network becomes possible.

Moreover, since a contents seller's management server can check for invalidation of the contents through a network from the invalidation result data by transmission and reception of the invalidation result data indicating invalidation of the contents between the information processors and the contents seller's management server, refund of the contents through the network is possible and the availability and distribution of the contents can be improved.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1(a) and 1(b) are block diagrams of mobile phones.

FIG. 2 is a software structural diagram in accordance with an exemplary embodiment of the invention.

FIG. 3 is a detailed diagram of a contents transfer function in accordance with an exemplary embodiment of the invention.

FIGS. 7(a) and 7(b) are sequence diagrams in relation to the exchange of contents in accordance with an exemplary embodiment of the invention.

FIG. 8 is a sequence diagram in relation to an Internet auction in accordance with an exemplary embodiment of the invention.

FIG. 9 is a sequence diagram of a deposit process in accordance with an exemplary embodiment of the invention.

DETAILED DESCRIPTION OF THE PREFERRED EMBODIMENTS

Figure 4:
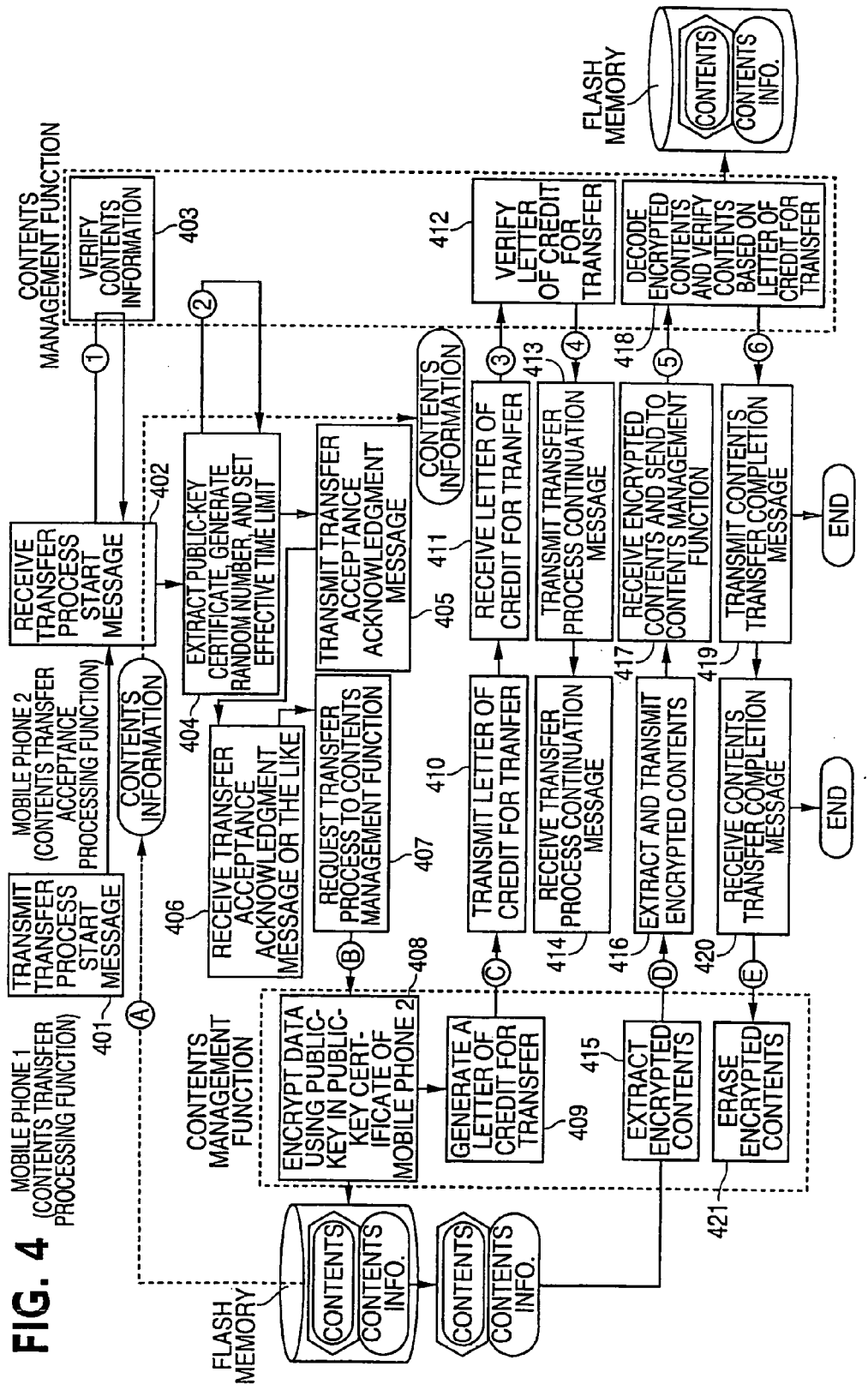
FIG. 4 is a sequence diagram for the transfer of contents in accordance with an exemplary embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A mobile phone will be described in the following embodiment as an example of an information processor. However, the term "information processor" includes a personal computer, PDA (Personal Digital Assistant) or the like in addition to a mobile phone and also includes any type of information processor which can realize radio communication. The radio communication includes communications via the network using IrDA (Infrared Data Association), BT (Bluetooth) communications or any other wireless connection means. Furthermore, it is possible to physically connect the information processor to a network or another information processor, thus this invention is not limited to radio or other wireless communication means.

Contents to be transferred, or the like, in the present invention are formed of real data having inherent value, license information, which grants the user rights for use of the contents, contents right data, such as an encryption key, and contents information such as a contents name and date of generation. Contents information indicates the contents to be transferred and includes a contents attribute list of the contents name, a date of generation, a file type and file size, or the like, or are formed with the addition of digital signatures of a contents designer and a contents seller. The digital signature indicates that the message received has originated from a legitimate originator in the online transaction and is therefore generated with a secret key using the public-key cryptography RSA or the like. When checking the legitimacy of a message from the encrypted signature, a public-key of an originator is used. The public-key is widely opened and anybody can check the legitimacy of a signature.

Contents are stored and administrated within a storage region in nonvolatile memory with a contents management function. Here, flash memory is considered as an example of the nonvolatile memory. Of course, a hard disk, or any other storage medium may also be used as the storage device for storing contents. The flash memory sometimes has an anti-tampering property in order to realize higher security. An anti-tampering property means the capability of preventing illegal reading of secret information with an illegal means for the hardware to process and store the secret information. For example, an anti-tampering property has been realized by forming a memory chip which erases recorded contents when the chip surface is exposed to the air, or a flash memory using a circuit which cannot be operated when a probe to read signals is mounted thereto.

FIGS. 1(a) and 1(b) are block diagrams of a mobile phone. FIG. 1(a) is a mobile phone of the single-mobile-processor-unit variety (1 MPU constitution) and FIG. 1(b) is a mobile phone of the multi-mobile-processor-unit variety (2 MPU constitution).

In FIG. 1(a), a MPU1 is constituted to perform both transmission and reception of an information processing unit and a communication control unit of the application operation. Therefore, a mobile phone of 1 MPU constitution is formed of the MPU1, a microphone 2, a speaker 3, a display 4, a keyboard 5, a camera 6, a USB (Universal Serial Bus)/IrDA (Infrared Data Association)/BT (Bluetooth) 7, a RAM (Random Access Memory) 8, a flash memory (registered trademark) 9, an external media slot 10, a BB (Base Band) module 11, an RF (Radio Frequency) module 12, and an antenna 13.

The mobile phone of 2 MPU constitution in FIG. 1(b) executes the information processes of an information processing unit 30 of the application operation or the like of the mobile phone having only one MPU 14. Meanwhile, the other MPU 27 is constituted to perform the transmission and reception processes of the communication control unit 31. The information processing unit 30 is formed of an MPU 14, a microphone 15, a speaker 16, a display 17, a keyboard 18, a camera 19, a USB (Universal Serial Bus)/IrDA (Infrared Data Association)/BT (Bluetooth) 20, a RAM (Random Access Memory) (registered trademark) 21, a flash memory (registered trademark) 22, and an external media slot 1210. The communication control unit 31 is formed of an MPU 27, a BB module 24, an RF module 25, a RAM 28, and a flash memory (registered trademark) 29.

The exemplary embodiment of the present invention having the 1 MPU style of FIG. 1(a), which has a more simplified structure, will be described in further detail. The camera 6 can comprise of a camera which can obtain both static images and dynamic images or a camera which can obtain only one kind of image, either static or dynamic. Audio data and image (static image or dynamic image) data which has been obtained with the microphone 15 and camera 6 using a mobile phone, are then stored in the flash memory 9 and may be transferred to other mobile phones, or other information processors, by using the present invention. In this exemplary embodiment, the transfer of contents, mainly among mobile phones, will be described as an example, but the present invention is not limited thereto and will also allow transfer of contents among any of the information processors connected to the network. Of course, contents may also be transferred among the information processors and mobile phones.

FIG. 2 is a software structure diagram related to transfer of contents among mobile phones in accordance with an exemplary embodiment of the invention.

Software related to transfer of contents among mobile phones of the present invention is constituted by a telephone function 201, a mailer 202, a browser 203, Java (registered trademark) 204, a camera application 205, a contents transfer function 206, a radio control function 207, a display screen control function 208, a data communication function 209, a contents management function 210, an operation system (OS) 211, and a device driver 212.

The display image control function 208, data communication function 209, and contents management function 210 are combined to form a framework. The framework is identical to a software system or an architecture which is formed by combining a plurality of software systems forming the base part of a certain service. The device driver 212 in FIG. 2 is used as the driver for the microphone 2, speaker 3, display 4, keyboard 5, camera 6, USB/IrDA/BT 7, external media slot 10, and BB module 11.

The softwares illustrated in FIG. 2 is operated in the MPU 1 when a user of the mobile phone inputs instructions using the keyboard 5, or the like, and thereby respective software operations are outputted to the display 4.

For the transfer of contents, a user of the mobile phone drives the contents transfer function 206 with the keyboard 5, selects the contents to be transferred, and transfers the contents to the other mobile phone. In this example, a transfer of contents through the network can be realized by generating a letter of credit having a digital signature ensuring erasure of contents to be transferred on the basis of the contents management function and transfer of contents, and by then transmitting the contents through the network after the letter of credit for transfer is transmitted to a mobile phone to which the contents are transferred through the network. Here, the network is assumed to include radio communication in which the radio control function 207 and the data communication function 209 are operated using the BB module 11, RF module 12, antenna 13, and MPU 1. Moreover, an infrared communication system based on IrDA or the like and a radio transmission system based on Bluetooth or the like can be used.

FIG. 3 is a detailed block diagram of the contents transfer function 206 in accordance with an exemplary embodiment of the invention.

The contents transfer function 206 includes a contents transfer acceptance processing unit 301 and a contents transfer processing unit 302. The contents transfer function 206 may also be formed with only one structure, namely with a software structure forming a mobile phone enabling only transfer of contents, or a mobile phone enabling only acceptance of transferred contents. This contents transfer function is operated within the MPU 1. When a user of the mobile phone desires to transfer the contents, the contents are transferred to the other mobile phone through the network by driving the contents transfer function 206 and operating the contents transfer processing unit 302 to transmit, through the network, the contents stored in the flash memory 9 and the letter of credit for the transfer of contents. Here, for example, the network comprises the radio communication realized by operating the radio control function 207 and the data communication function 209 using the BB module 11, RF module 12, antenna 13, and MPU 1 (FIG. 1(a)).

Moreover, when a user of the mobile phone desires to purchase the contents from the other mobile phone, it is possible to purchase the contents through the network by driving the contents transfer function 206 and operating the contents transfer acceptance processing unit 302 to receive, through the network, the contents and the letter of credit for transfer of contents from the other mobile phone.

FIG. 4 is a sequence diagram for transfer of contents from a mobile phone 1 to a mobile phone 2 in accordance with an exemplary embodiment of the invention.

Here, the mobile phone for transferring contents is defined as mobile phone 1, while the mobile phone of a partner to which the contents may be transferred is mobile phone 2.

The mobile phone 1 is provided with a contents management function 210 and a contents transfer processing function. The mobile phone 2 is also provided with a contents management function and is further provided with a contents transfer acceptance processing function. Additionally, these mobile phones store the public-key and the secret key based on the public-key cryptography RSA.

For transfer of contents to a user of the mobile phone 2, a user of the mobile phone 1 drives the contents transfer processing function of the mobile phone 1 by manipulating the keyboard or the like. The contents transfer processing function calls the contents management function and extracts the contents information stored in the flash memory to display the contents information, a contents list, or the like, newly generated from a part of the information included in the contents information on the display 4. The user of the mobile phone 1 selects the contents to be transferred from the contents list or the like.

The contents list is a list of names of contents in the mobile phone 1 and this list may include attributes of contents in addition to the names. Attributes of contents may comprise, for example, a date of generation of the contents, a file type and a file size of contents, or the like.

It is not required to display a list of all contents in the mobile phone 1. For example, the list may comprise the list of information pieces to be transferred or only those contents selected by user.

The contents transfer processing function of the mobile phone 1 extends the connection to the mobile phone 2 using the BB module 11, RF module 12, and antenna 13, or other wired or wireless transmission means, and transmits the transfer process starting message to the mobile phone 2 to instruct the start of the transfer of contents to the mobile phone 2 (401) and to extract from the flash memory and transmit the contents information of the contents selected by the user for transfer from the contents list. The contents information is extracted from the flash memory 9 using the contents management function 210. The contents transfer processing function comprises the function with which the MPU operates upon in the contents transfer processing unit 302.

Upon reception of the transfer process start message and the contents information, the contents transfer acceptance processing function of the mobile phone 2 checks the contents of the contents information received (402, 403). The contents transfer acceptance processing function comprises the function with which the MPU operates upon in the contents transfer acceptance processing unit 301.

Contents of the contents information can be verified by displaying the names of contents included in the contents information with a display, or the like, on mobile phone 2 or by displaying contents of the digital signature when the digital signature, proving transmission by the mobile phone 1, is added to the contents information.

Thereafter, the contents transfer acceptance processing function generates a random number (nonce) and transmits a public-key certificate, the random number, an effective time limit, and a transfer acceptance acknowledging message stored in the flash memory of the mobile phone 2 to the mobile phone 1 by setting the effective time limit for processing the transfer process of the contents (404, 405). The public-key certificate includes the public-key, contents management function ID for identifying the contents management function, and digital signature based on the CA (Certificate Authority) and is then stored in the flash memory of the mobile phone 2.

Upon reception of the transfer acceptance acknowledging message, the public-key certificate, the random number, and the effective time limit from the mobile phone 2, the contents transfer processing function of the mobile phone 1 requests the transfer process of the contents to the contents management function (406, 407).

The contents management function of the mobile phone 1 generates the encrypted contents by encrypting the contents to be transferred using the public-key in the public-key certificate (408). In this example, it is assumed that the contents to be transferred together with the encrypted contents are left within the flash memory 9.

Here, the contents management function generates, at random, the common key of DES and RC4, or the like, and encrypts the contents using this common key and further encrypts the common key using the public-key of the mobile phone 2.

The contents management function of the mobile phone 1 erases the contents from the flash memory 9 and continuously stores the encrypted contents.

The contents management function of the mobile phone 1 generates a letter of credit for transfer, indicating that the contents are erased and the encrypted contents are generated, and then transmits the letter of credit to the mobile phone 2 with the contents transfer processing function (409, 410).

Figure 10:
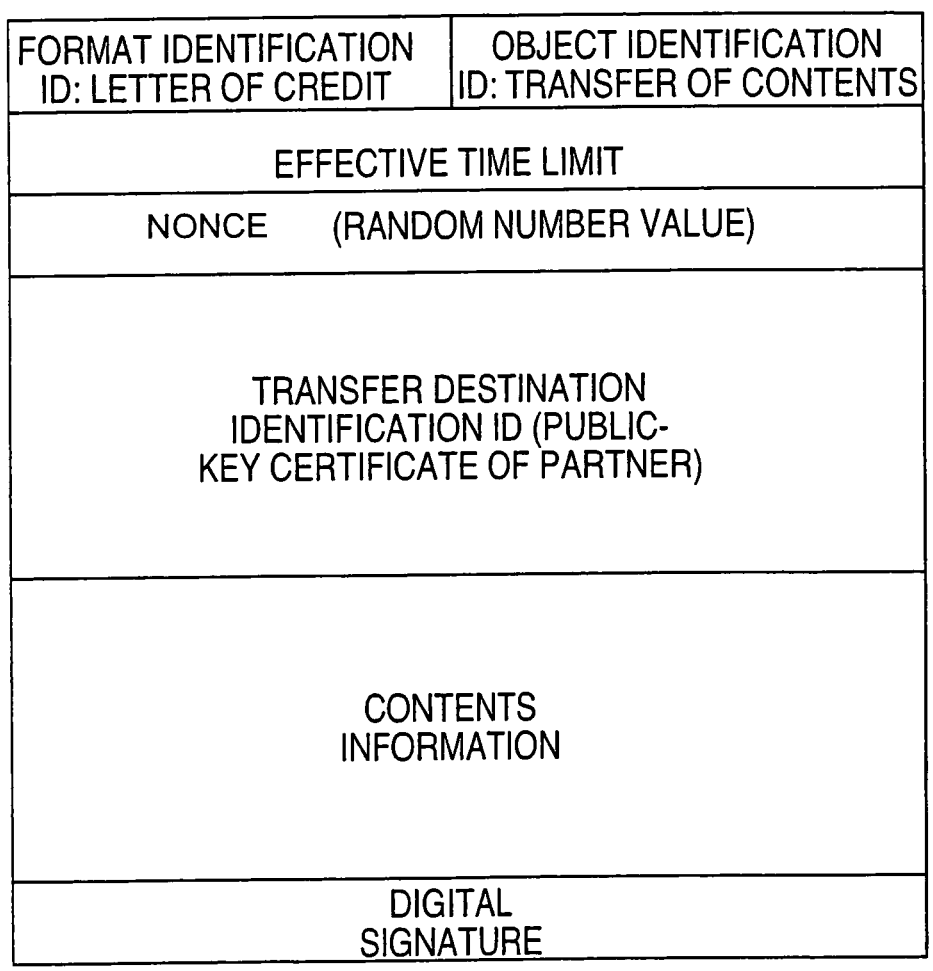
FIG. 10 is a format diagram of a letter of credit for transfer in accordance with an exemplary embodiment of the invention.

FIG. 10 is a format diagram of the letter of credit for transfer in accordance with an exemplary embodiment of the invention.

The letter of credit for transfer is formed of a file format identification, indicating that a file is the letter of credit for transfer, an object identification (ID), indicating the contents transfer object, an effective time limit for transfer, a random number (nonce), a transfer destination identification (ID), indicating the transfer destination of contents (here, it is identified that the transfer destination is the mobile phone 2 with the public-key certificate of the mobile phone 2), contents information, and a digital signature. Here, the digital signature is the signature generated with the secret key such as RSA, or the like, of the mobile phone 1, which certificates erasure of contents and encryption of contents to the user of the mobile phone 2.

Figure 5:
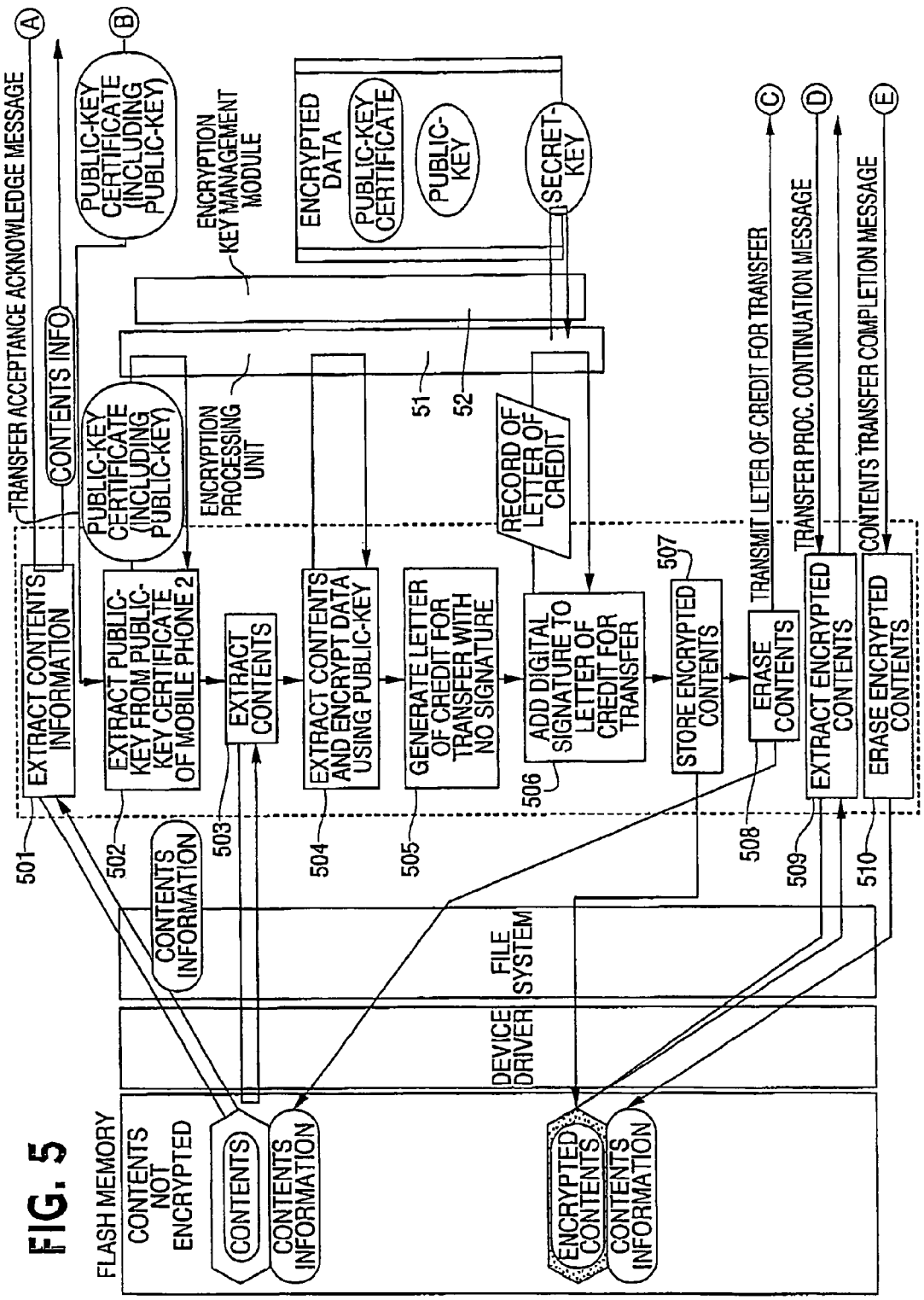
FIG. 5 is a detailed sequence diagram of the mobile phone 1 in relation to the transfer of contents in accordance with an exemplary embodiment of the invention.

In this example, the secret key for generating the digital signature, the public-key corresponding to this secret key, and the public-key certificate are also encrypted in the mobile phone 1 and are stored in the flash memory thereof, enabling access from only an encryption key management module 52 (FIG. 5).

Figure 6:
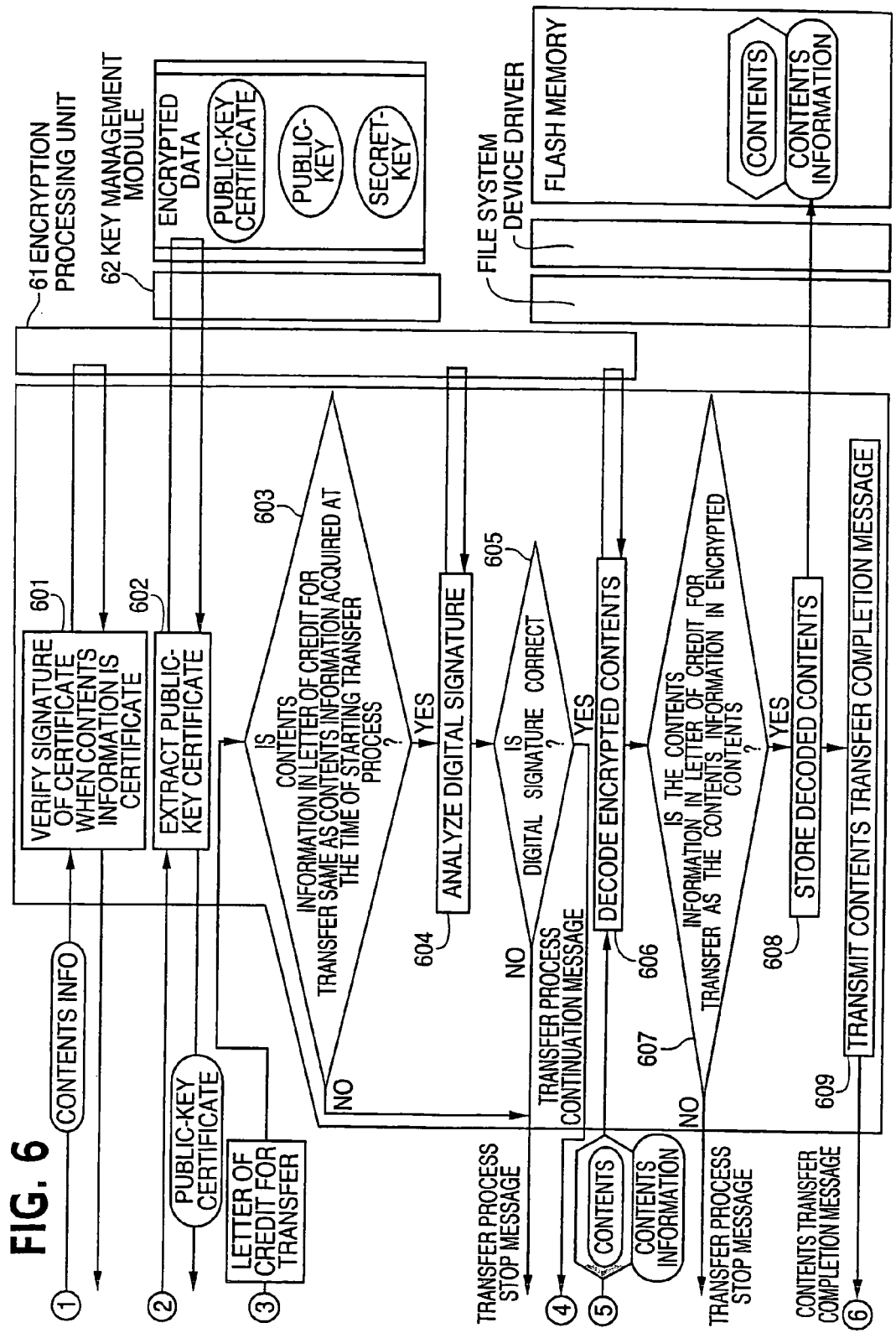
FIG. 6 is a detailed sequence diagram of the mobile phone 2 in relation to the transfer of contents in accordance with an exemplary embodiment of the invention.

When the digital signature is generated in the mobile phone 1, an encryption processing unit 51 is operated to make access to the secret key from the encryption key management module 52. The secret key is encrypted in the encryption processing unit 51 and the digital signature is generated in the encryption processing unit 51 using the encrypted secret key. The encryption processing unit 51 and encryption key management module 52 are operated by the MPU. An example of the encryption processing unit 51 and encryption key management module 52 are illustrated in FIG. 5. Additionally, as illustrated in FIG. 6, the mobile phone 2 also includes an encryption processing unit 61 and an encryption key management module 62.

In the present structure, when the contents transfer process has been completed within the effective time limit designated by the mobile phone 2, facilities are provided to receive, from the mobile phone 2, the secret key corresponding to the public-key having generated the encrypted contents and to convert the encrypted contents to the original contents.

The contents transfer acceptance processing function of the mobile phone 2 receives the letter of credit for transfer and transmits, when contents are correct, the transfer process continuation message to the mobile phone 1 after the contents of the letter of credit for transfer are verified with the contents management function (411, 412, 413).

After the transfer process continuation message is received with the contents transfer processing function of the mobile phone 1, the encrypted contents are extracted from the flash memory with the contents management function and are then transmitted to the mobile phone 2 (414, 415, 416).

The contents transfer acceptance processing function of the mobile phone 2 sends the letter of credit for transfer and the encrypted contents received from the mobile phone 1 to the contents management function (417). The contents management function encrypts the real data of contents and the contents right data using the secret key from the letter of credit for transfer and the encrypted contents and then stores the data to the flash memory (418). Thereafter, when the decoding process of contents is completed, the contents transfer completion message indicating that the contents are completely stored to the flash memory is transmitted to the mobile phone 1 (419).

The mobile phone 1 erases, upon reception of the contents transfer completion message from the mobile phone 2, the encrypted contents from the flash memory with the contents management function (420, 421).

FIG. 5 is a detailed sequence diagram of the mobile phone 1 in relation to transfer of contents. Circled letters A, B, C, D, and E of this figure correspond to circled letters A, B, C, D, and E of FIG. 4.

At the time of instructing the contents transfer start message, the mobile phone 1 extracts the contents information of the contents to be transferred from the flash memory with the contents management function (501) and then transmits this information to the mobile phone 2.

After reception of the public-key certificate from the transfer acceptance processing function of the mobile phone 2, the public-key for encrypting the contents is extracted from the public-key certificate using the encryption processing unit 51 (502).

The contents management function of the mobile phone 1 extracts the contents to be transferred from the flash memory and encrypts the contents using the public-key extracted from the public-key certificate to generate the encrypted contents (503, 504).

The contents management function of the mobile phone 1 generates a record of a letter of credit for transfer and adds a signature to the letter of credit for transfer (505, 506). The record of the letter of credit for transfer is formed of a file format identification (ID), an object identification (ID), indicating the contents transfer object, a random number (nonce), a transfer destination identification (ID), indicating the transfer destination for transfer of contents (here, it is identified that the transfer destination is the mobile phone 2 with the public-key certificate of the mobile phone 2), and contents information. The digital signature is generated by adding, to the record of the letter of credit for transfer, the digital signature which proves to a user of the mobile phone 2 that the contents are erased and encrypted.

The contents management function of the mobile phone 1 stores the encrypted contents to the flash memory and erases the contents before encryption. The letter of credit for transfer indicating that the contents are erased and encryption is completed, is transmitted to the mobile phone 2 (507, 508).

After the mobile phone 2 transmits the transfer processing continuation message of the encrypted contents and the contents transfer processing function receives this message, the contents management function of the mobile phone 1 extracts the encrypted contents from the flash memory and transmits the contents to the mobile phone 2 with the contents transfer processing function (509).

Upon reception of the contents transfer completion message from the mobile phone 2, the mobile phone 1 erases the encrypted contents from the flash memory with the contents management function (510).

FIG. 6 is a detailed sequence diagram of the mobile phone 2 in relation to the transfer of contents in accordance with an exemplary embodiment of the invention. Circled numerals 1, 2, 3, 4, and 5 in FIG. 6 correspond to circled numerals 1, 2, 3, 4, and 5 of FIG. 4.

The mobile phone 2 verifies contents of the contents information when the contents information of the contents transferred with the contents transfer processing function of the mobile phone 1 are transmitted and received with the contents transfer acceptance processing function (601).

When the contents of the contents information are correct, the mobile phone 2 operates the encryption processing unit and extracts the public-key to be encrypted, the contents management function ID for identifying the contents management function and the public-key certificate, including the digital signature with CA, by accessing the flash memory with the encryption key management module in view of transmitting the public-key certificate to the mobile phone 1 with the contents transfer acceptance processing function (602). Here, the public-key certificate is stored as the encrypted data in the flash memory in a format accessible only from the encryption key management module 62.

Upon reception of the letter of credit for transfer from the mobile phone 1, the contents transfer management function of the mobile phone 2 extracts the contents information to be transferred in the letter of credit for transfer for comparison with the contents information acquired when the transfer process is started (603).

The contents transfer management function of the mobile phone 2 analyzes, when the compared contents information are matched with each other, the digital signature added to the letter of credit for transfer (604) and transmits, when the digital signature is correct, the transfer processing continuation message to the mobile phone 1 (605). When the digital signature is not correct, the transfer process stop message is transmitted to the mobile phone 1 (605).

The contents transfer management function of the mobile phone 2 decodes, upon reception of the encrypted contents from the mobile phone 1, the encrypted contents with the encryption processing unit 61 and compares the contents information in the encrypted contents with the contents information in the letter of credit for transfer (606, 607).

When the contents information is matched, the contents information is stored in flash memory (608). The contents management function of the mobile phone 2 instructs the contents transfer acceptance processing function to transmit the contents transfer completion message to the mobile phone 1 (609).

Figure 7B:
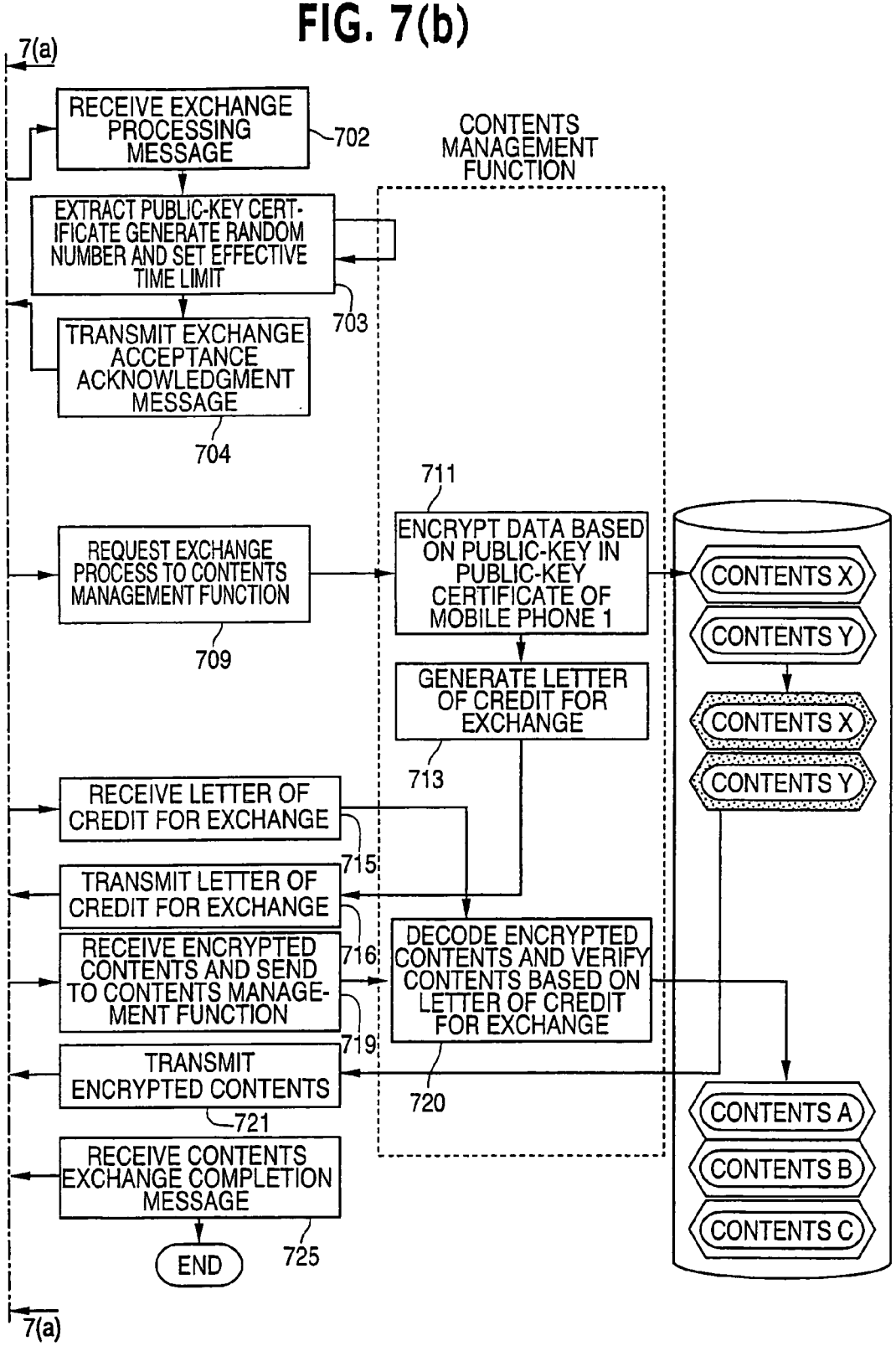

FIG. 7 (including FIGS. 7(*a*) and 7(*b*)) is a sequence diagram in relation to an exchange of contents between the mobile phones 1 and 2 in accordance with an exemplary embodiment of the invention. The exchange of contents is an extension of the contents transfer method. In particular, the exchange of contents may be realized through conjunction of contents transfers in the mobile phones 1 and 2.

The mobile phones 1 and 2 are provided with the contents management function and a contents exchange processing function. Moreover, these mobile phones store the public-key and secret key based the public-key cryptograph RSA within the flash memory.

An example of an exchange of the contents A, B, and C of the mobile phone 1 with the contents X and Y of the mobile phone 2 will be described below.

A user of the mobile phone 1 drives the contents exchange processing function of the mobile phone 1 to perform the exchange of contents with the mobile phone 2. The contents exchange processing function calls the contents management function and displays the contents list on the display. A user selects the contents A, B, and C for exchange between the mobile phone 1 and mobile phone 2. The mobile phone 2 also drives the contents exchange processing function and selects, from the contents list, the contents X, Y for exchange with the mobile phone 1. Here, the number of contents to be exchange is not required to be limited to the above contents and exchange of contents is possible in the form of n:M (n, m are natural numbers).

The contents exchange processing function of the mobile phone 1 connects the mobile phone 2 using the BB module 11, RF module 12, and antenna 13, or the like, and transmits the exchange processing start message to the mobile phone 2 to instruct the start of contents exchange to the mobile phone 2 (701), then extracts the contents information of the contents A, B, and C from the contents list and then transmits the above contents information. The contents exchange processing function comprises the function the MPU operates upon in the contents exchange processing unit. The contents exchange processing unit is provided corresponding to the contents transfer processing (see 302 in FIG. 3) unit for the contents transfer.

The contents exchange processing function of the mobile phone 2 receives the exchange processing start message and transmits, for execution of the contents exchange, the exchange acceptance acknowledging message to the mobile phone 1 with inclusion of the contents information of the contents X, Y to be exchanged with the mobile phone 2, a random number (nonce), an effective time limit of the contents exchange process, and a public-key certificate stored in the flash memory of the mobile phone 2 (702, 703, 704). Here, the public-key certificate includes the public-key, a contents management function ID for identifying the contents management function, and a digital signature by the CA.

The contents exchange processing function of the mobile phone 1 transmits, upon reception of the exchange acceptance acknowledging message, the exchange acceptance verifying message to the mobile phone 2 with inclusion of the random number (nonce), the effective time limit of the contents exchange process, and a public-key certificate stored in the flash memory of the mobile phone 1 (705, 706, 707).

Upon reception of the exchange acceptance verifying message, the contents exchange processing function of the mobile phone 2 requests the exchange process to the contents management function (708).

Thereafter, the contents exchange processing function requests the exchange process to the contents management function of the mobile phone 1 (709).

The contents management functions of both mobile phones 1 and 2 encrypt the contents to be exchanged using the public-keys included in the public-key certificates received to generate the encrypted contents A, B, C in the mobile phone 1 and the encrypted contents X, Y in the mobile phone 2 (710, 711). Here, it is also possible that the contents management functions of the mobile phones 1 and 2 generates, at random, the common key for common key encryption such as DES and RC4, or the like, the contents to be exchanged are encrypted using such common key, and the common key is encrypted using the public-key received.

The contents management functions of both mobile phones 1 and 2 thereafter erase the contents. The encrypted contents are continuously stored in the flash memory.

The contents management functions of both mobile phones 1 and 2 respectively generate the letters of credit for transfer 1, 2 indicating that the contents to be exchanged by the mobile phones are erased and encrypted (712, 713). Here, the letter of credit for exchange is the same kind of letter of credit for transfer described above.

The contents exchange processing function of the mobile phone 1 transmits the letter of credit for exchange 1 to the mobile phone 2 (714).

The contents exchange processing function of the mobile phone 2 receives the letter of credit for exchange and transmits, after verification of contents, the letter of credit for exchange 2 of the mobile phone 2 to the mobile phone 1 (715, 716). In this embodiment, the letters of credit for exchange 1 and 2 have been transmitted mutually to the mobile phones in the above sequence, but the present invention is not limited thereto. The transmission sequence may be inverted and such letters of credit for exchange may be transmitted simultaneously to the mobile phones.

The contents exchange processing function of the mobile phone 1 receives the letter of credit for exchange 2 from the mobile phone 2 and thereafter transmits the encrypted contents A, B, and C to be exchanged (717, 718).

The contents exchange processing function of the mobile phone 2 sends, after reception of the encrypted contents A, B, and C, the letter of credit for exchange 1 and the encrypted contents A, B, and C to the contents management function. The contents management function decodes the contents from the letter of credit for exchange 1 and the encrypted contents A, B, and C and stores the contents to the flash memory. Thereafter, the encrypted contents X, Y are transmitted to the mobile phone 1 (719, 720, 721).

The contents exchange processing function of the mobile phone 1 sends, after reception of the encrypted contents X, Y, the letter of credit for exchange 2 and the encrypted contents X, Y to the contents management function. The contents management function decodes the contents X, Y from the letter of credit for exchange 2 and the encrypted contents X, Y, and stores these contents to the flash memory (722, 723).

The mobile phone 1 transmits the contents exchange completion message to the mobile phone 2 with the contents exchange processing function and the mobile phone 2 receives the contents exchange completion message with the contents exchange processing function (724, 725). In this timing, both mobile phones 1 and 2 erase the respective encrypted contents A, B, C and the encrypted contents X, Y from the respective flash memories.

FIG. 8 is a sequence diagram illustrating the Internet auction of contents in accordance with an exemplary embodiment of the invention. On the occasion of conducting the Internet auction of contents through the networks, it is required for users to guarantee that users do not transfer the contents to be brought into the Internet auction to other users for the particular period designated by users (hereinafter referred to as a block time limit).

A mobile phone is provided with a function to issue a letter of credit for a block to realize Internet auction of contents, a function to verify the contents of the letter of credit for the block, and a block time limit management function for management of the block time limit in its contents management function. Here, the letter of credit for the block is issued to guarantee that the contents to be brought into the Internet auction are encrypted using the common key, the contents are never transferred to others until the Internet auction is completed, and the contents are maintained as encrypted contents.

A user who is introducing the contents to the Internet auction selects the block of contents and designates the block time limit for the block in view of instructing that the contents are never transferred and exchanged.

The contents management function generates a temporary encryption key for blocking the contents (801). Here, the temporary encryption key means a key for encrypting the contents to be introduced into the Internet auction for blocking during the block time limit. Moreover, the temporary encryption key may be a common key for common key encryption such as DES and RC4 or the like, or may be an encryption key such as RSA or the like.

The contents management function encrypts the contents to be introduced into the Internet auction using the temporary encryption key (802). The contents management function generates a letter of credit for the block (803). The letter of credit for the block is presented on the web site for the Internet auction in order to indicate, to the other users, that the contents have not been transferred and will be held during the block time limit (804).

The letter of credit for the block is formed of contents information, block time limit, public-key certificate, and digital signature by the secret key for the public-key certificate. The contents management function registers contents information, temporary encryption key, and block time limit with the block time limit management function (805).

The contents management function rejects the access for encryption when the access to the contents encrypted with the temporary encryption key is generated.

The block time limit management function supervises and acquires periodically the current time, and compares the block time limit with the current time. When the block time limit has reached the current time, the contents are decoded with the registered temporary encryption key (806, 807, 808).

FIG. 9 is a sequence diagram for executing the deposit process by providing a deposit process server between the mobile phones 1 and 2 in the case of executing the transfer of contents between the mobile phones 1 and 2 in accordance with an exemplary embodiment of the invention.

The contents deposit processing function is carried out for conducting transfer and exchange of contents by providing the deposit processing server between the mobile phones 1 and 2. The mobile phone 1 is provided with the contents management function and contents transfer processing function. The mobile phone 2 is provided with the contents management function and contents transfer acceptance processing function. The deposit processing server is provided with the contents management function and contents deposit processing function.

When the deposit process for transfer of contents is required, a user of the mobile phone 1 drives the contents transfer processing function of the mobile phone 1. The contents transfer processing function extracts the contents information stored in the flash memory by calling the contents management function and then displays the contents list on the display. A user selects the contents to be transferred from the contents list.

The contents transfer function connects the deposit processing server using the BB module 11, RF module 12, and antenna 13, or the like, transmits the contents transfer process start message to the deposit processing server, extracts the contents information of the contents selected by the user for transfer from the contents list, and then transmits these contents. The contents information is extracted from the flash memory with the contents management function. The contents transfer processing function comprises the operation of the MPU upon the contents transfer processing unit.

The contents deposit processing function of the deposit processing server verifies, upon reception of the transfer process start message, the contents of the contents information received. The contents deposit processing function comprises the operation of the MPU upon the deposit processing server.

Thereafter, the contents deposit processing function generates a random number (nonce) and transmits the transfer acceptance acknowledging message to the mobile phone 1 with inclusion of the effective time limit for transfer process and public-key certificate stored by the contents management function. The public-key certificate includes the public-key, contents management function ID for identifying the contents management function and digital signature by the CA. This public-key certificate is stored in the storage device of the deposit processing server.

The contents transfer processing function of the mobile phone 1 requests, upon reception of the transfer acceptance acknowledging message, the transfer process to the contents management function. The contents management function of the mobile phone 1 generates, at random, the common key, then encrypts the contents using the common key and generates the encrypted contents. The encryption key to generate the encrypted contents may be the public-key or secret key.

The contents management function of the mobile phone 1 thereafter erases the contents, while storing the encrypted contents. The contents management function of the mobile phone 1 generates a letter of credit for deposit indicating that the contents have been erased and encrypted and the contents transfer deposit function transmits the letter of credit for deposit to the deposit processing server.

The letter of credit for deposit is formed of a list of the file format identification ID indicating the file is the letter of credit for deposit, an object identification ID indicating the contents transfer object, an effective time limit for transfer, contents information, a random number (nonce) received with the transfer acceptance acknowledging message, and an encrypted common key obtained by encrypting the common key used to encrypt the encrypted contents with the public key of the deposit processing server, with addition of the digital signature by the secret key such as the RSA or the like of the mobile phone 1 of such list.

The contents deposit processing function of the deposit processing server transmits, after verifying the letter of credit for deposit, the deposit process continuation message indicating continuation of the deposit process to the mobile phone 1. The contents transfer function of the mobile phone 1 transmits, after reception of the deposit process continuation message, the encrypted contents to the deposit processing server.

The contents deposit processing function of the deposit processing server sends the letter of credit for deposit and the encrypted contents to the contents management function. The contents management function decodes the encrypted contents and stores the decoded contents to the flash memory. Moreover, when the contents are stored into the flash memory, the encrypted contents are not decoded and the encrypted contents may be stored.

The contents deposit processing function requests, to the contents management function of the mobile phone 1, generation of a deposit certificate and an interchange certificate (901). The deposit certificate is formed of a deposit serial number, an effective time limit, contents information, a deposit source identification ID, a list of final transfer destination identification ID, and a digital signature by the secret key of the public-key encryption for contents management of the deposit processing server. The deposit serial number and the effective time limit are administrated by the contents deposit processing function and are then sent by the contents deposit processing function. The deposit source identification ID is the information for identifying the transfer source and the public-key certificate of the mobile phone 1.

The final transfer destination identification is the information for identifying the transfer destination and the public-key certificate of the mobile phone 2. The interchange certificate is formed of a deposit serial number of a deposit certificate, a list of effective time limits, and a digital signature by the secret key of the public-key for contents management of deposit processing server of such list.

The contents management function of the deposit processing server generates the deposit certificate and interchange certificate and then transmits these certificates to the mobile phone 1 (902, 903, 904). The contents transfer processing function of the mobile phone 1 receives the deposit certificate and interchange certificate from the deposit processing server (905).

The mobile phone 1 transmits the deposit certificate to the mobile phone 2 (906). The contents transfer acceptance processing function of the mobile phone 2 receives the deposit certificate (907).

A user of the mobile phone 2 verifies the deposit process by observing the contents of the deposit certificate (908). The user pays the contents fee through the network (909). Here, payment of fee may be done, for example, using a credit card, using the FeliCa (registered trademark) or the like. Moreover, it is also possible to make payment at the teller's window of a bank, at a store capable of processing the payment, or the like.

After verification of deposit money for the contents fee, the user of the mobile phone 1 transmits the interchange certificate to the mobile phone 2 with the contents transfer function (910). Upon reception of the interchange certificate, the contents transfer acceptance processing function of the mobile phone 2 transfers, to the deposit processing server, the contents transfer request message with inclusion of the deposit certificate and interchange certificated received, a random number (nonce), an effective time limit of transfer process, and a public-key certificate stored by the contents management function (911, 912).

The contents deposit processing function of the deposit processing server verifies, upon reception of the transfer request message, the deposit certificate and interchange certificate. After the verification, the contents deposit processing function requests the transfer process to the contents management function (913, 914). The contents management function of the deposit processing server generates at random the common key to encrypt the contents using this common key. The contents management function of the deposit processing server erases thereafter the contents and stores the encrypted contents to the flash memory.

The contents management function of the deposit processing server generates a letter of credit for deposit indicating that the contents are erased and encrypted and the contents deposit processing function transmits this letter of credit for deposit to the mobile phone 2.

The contents transfer acceptance processing function of the mobile phone 2 transmits, after verification of the contents of the letter of credit for deposit, the message indicating significance for continuation of the process to the deposit processing server. The contents deposit processing function of the deposit processing server transmits, after reception of the deposit process continuation message, the encrypted contents.

The contents transfer acceptance processing function of the mobile phone 2 transfers the letter of credit for deposit and the encrypted contents to the contents management function. The contents management function decodes, from the letter of credit and encrypted contents, the real data of the contents and the contents right data and stores these data elements to the flash memory. Thereafter, the contents transfer completion message is transmitted to notify, to the deposit processing server, that the deposit process has been completed successfully. The deposit processing server 2 erases, upon reception of the contents transfer completion message from the mobile phone 2, the encrypted contents. Next, a user can erase the contents if the contents are no longer necessary, but at present the user is allowed only to waste the contents or take a similar action. Here, refund of the contents fee through the network will be described. In this case, an invalidation notifying function is provided to a mobile phone for sending a contents invalidation notification for the refund of the contents fee between the mobile phone and the contents seller.

Figure 11:
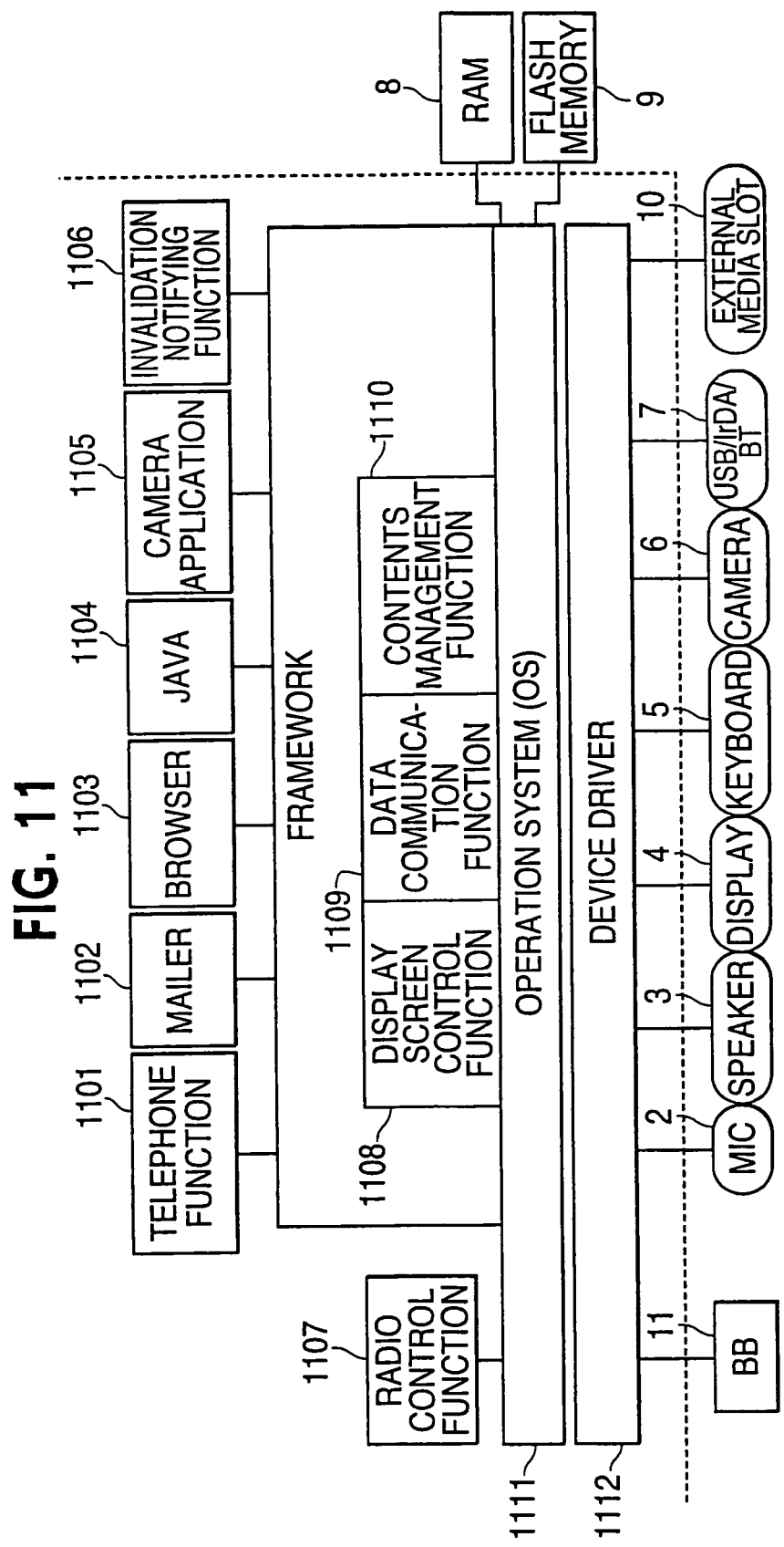
FIG. 11 is a software structural diagram in accordance with an exemplary embodiment of the invention.

FIG. 11 is a software structure diagram of a mobile phone in relation to the refund of the contents fee in accordance with an exemplary embodiment of the invention. The software structure is formed of a telephone function 1101, a mailer 1102, a browser 1103, Java (registered trademark) 1104, a camera application 1105, a contents invalidation notifying function 1106, a radio control function 1107, a display screen control function 1108, a data communication function 1109, a contents management function 1110, an operation system (OS) 1111, and a device driver 1112. The display screen control function 1108, data communication function 1109 and contents management function 1110 are combined to form a framework.

In comparison with the software structure for the contents transfer illustrated in FIG. 4, the contents transfer function 206 is replaced with the contents invalidation notifying function 1106. Moreover, the hardware structure is identical to that of contents transfer.

Figure 12:
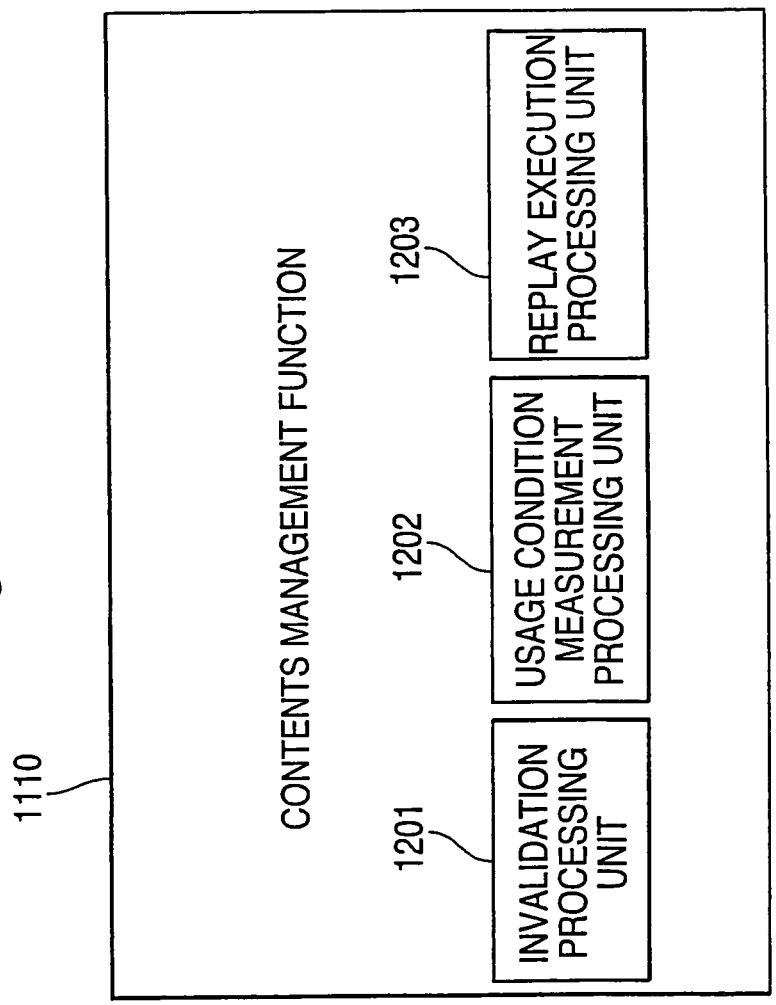
FIG. 12 is a software structural diagram of a contents management function in accordance with an exemplary embodiment of the invention.

FIG. 12 is a detailed software structure diagram of the contents management function of a mobile phone in relation to the refund of the contents fee in accordance with an exemplary embodiment of the invention. The contents management function 1110 is constituted of a contents invalidation processing unit 1201, a usage condition measurement processing unit 1202, and a replay execution processing unit 1203. The contents invalidation processing unit 1201, usage condition measurement processing unit 1202 and replay execution processing unit 1203 are operated within the MPU. The contents invalidation processing unit 1201 receives a request for invalidating the contents from the contents invalidation notifying function 1106 and executes the contents invalidation process. The usage condition measurement processing unit 1202 measures, in the mobile phone, the usage time and the number of times of usage of the contents. Based on this usage condition of the contents, the contents seller is capable of determining the refund fee or the like of the contents. The replay execution processing unit 1203 executes the processes such as the replay of contents. The replay execution processing unit 1203 is also provided in the contents management function 210 of FIG. 2 in relation to the mobile phone to execute the transfer and exchange or the like of the contents (not illustrated).

A mobile phone user notifies a contents seller management server of the contents to be invalidated with an invalidation notifying function. When it is acknowledged that the contents are to be invalidated, the contents seller management server generates an acknowledgment code for invalidating the contents or the right to use the contents. Upon reception of the acknowledgment code with the contents invalidation notifying function, the mobile phone invalidates the contents or the right to use the contents with the contents invalidation processing unit 1201 of the contents management function 1110 of the mobile phone, generates the contents invalidation result message based on the received acknowledgment code, and then transmits this message to the contents seller management server. In this example, the usage condition measurement processing unit 1202 measures in advance of the usage time and the number of times of usage of the contents and transmits the contents usage condition to the contents seller management server together with the invalidation result message. The contents seller management server verifies the contents invalidation result message, calculates the amount of the refund for the contents fee, and pays back the amount of refund to the mobile phone 2 through the network.

Figure 13:
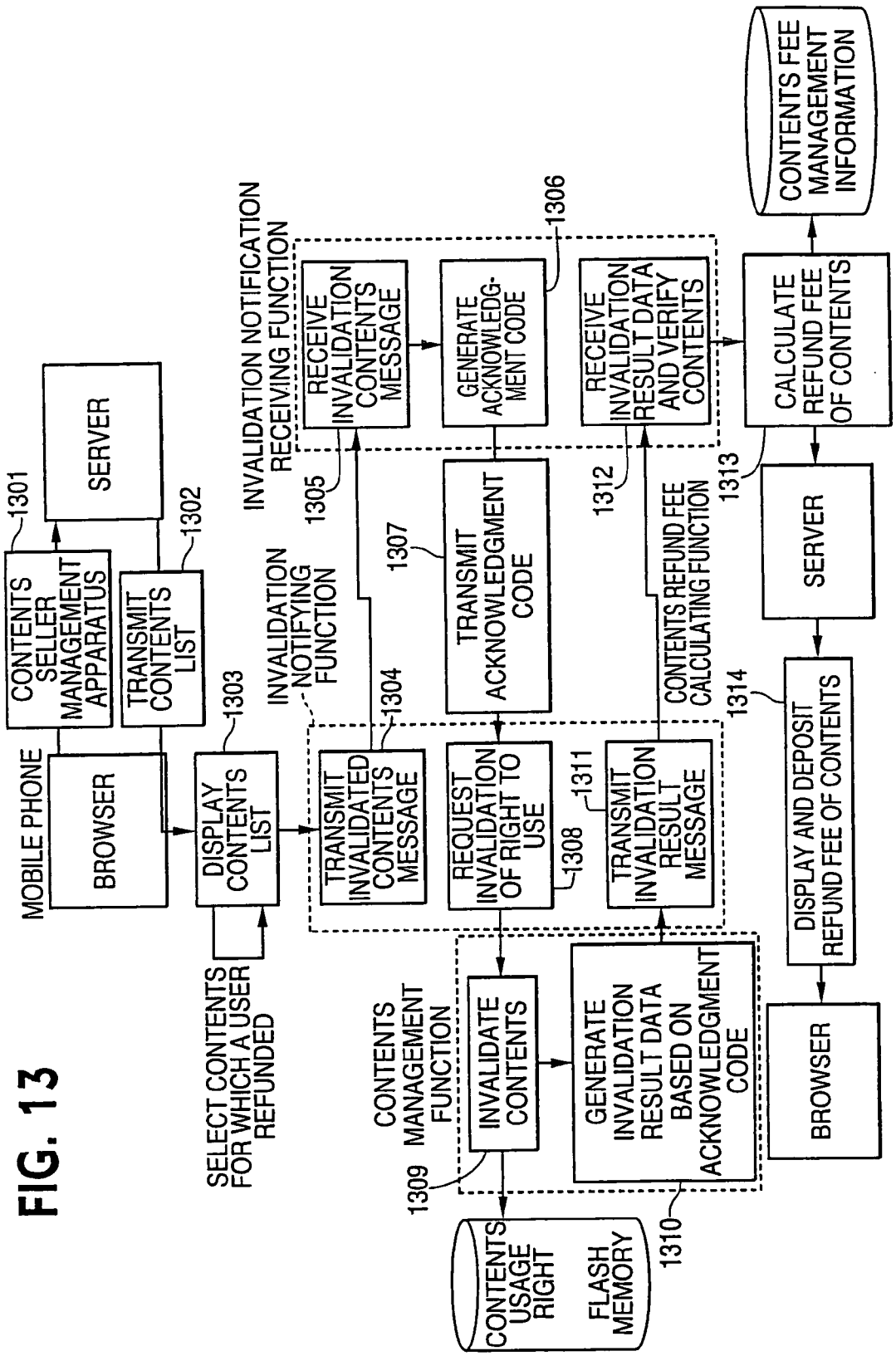
FIG. 13 is a sequence diagram in relation to a refund of a contents fee in accordance with an exemplary embodiment of the invention.

FIG. 13 is a sequence diagram illustrating the refund of the contents fee of a mobile phone in accordance with an exemplary embodiment of the invention. A mobile phone user extends the connection to the contents seller management server of the contents shop site from which the user purchased the contents in the past using the BB module 11, RF module 12 and antenna 13, or the like, and displays the contents shop site on the display using the browser. A mobile phone user selects a refund menu of the contents seller management server displayed by the browser using a keyboard, or the like, and transmits the refund process start message (1301).

The contents seller management server drives an invalidation notification receiving function and transmits, to the mobile phone, a contents list of the contents purchased in the past on the basis of the user ID connected or the like (1302). In this case, as the MIME-type, for example, x-paybackable/x-content-list are provided to the mobile phone. Moreover, in this case, the usage condition data of the contents measured by the usage condition measurement processing unit 1202 is also transmitted to the contents seller management server.

The browser of the mobile phone analyzes the MIME-type and sends to the invalidation notifying function. Here, the contents list is displayed with the browser and a user can select the contents for refund (1303). In this case, the invalidation notifying function transmits, to the contents seller management server, the invalidation contents message indicating the contents which the user of mobile phone desires to invalidate using the BB module 11, RF module 12 and antenna (1304), or the like.

The invalidation notification receiving function of the contents seller management server receives the invalidation contents message, generates an acknowledgment code when refund by invalidation is acknowledged, and then transmits this acknowledgment code to the mobile phone (1305, 1036, 1307).

FIG. 15(*a*) illustrates an exemplary embodiment format of the acknowledgment code in accordance with an exemplary embodiment of the invention. The acknowledgement code indicates that refund of contents fee requested from the mobile phone, is acknowledged. The acknowledgment code is formed of a sequence number, contents ID, a time stamp, a random number, and a digital signature. The digital signature guarantees that the originator of the acknowledgment code is the contents seller management server. The invalidation notifying function of the mobile phone, having received the acknowledgment code, requests invalidation of contents to the contents management function 1110 (1308). The contents management function 1110 invalidates the contents by verifying the acknowledgment code and generates the invalidation result data on the basis of the acknowledgment code (1309, 1310). In some cases, the right to use the contents may be invalidated and both contents and the right to use the contents may also be invalidated.

FIG. 15(*b*) illustrates an exemplary embodiment of the format of the invalidation result data. The invalidation result data indicates that the contents to be refunded are invalidated. The invalidation result data is formed of an acknowledgment code, a time stamp, and a digital signature. Here, the acknowledgment code is acquired from the contents seller management server in order to transmit the invalidation result data with higher security. The data obtained by adding the digital signature based on the secret key of the public-key encryption system such as the RSA or the like of the mobile phone to the data formed of the acknowledgment code, and the time stamp is transmitted, as the invalidation result data to the contents seller management server.

The invalidation notifying function transmits the invalidation result data to the contents seller management server (1311). The invalidation notification receiving function of the contents seller management server receives the invalidation result data, verifies contents of the invalidation result data and executes, when it has been verified that the invalidation process has been conducted accurately, the refund process for the contents (1312).

A refund amount calculating function in the contents seller management server calculates the amount of the refund for the contents, displays the amount of the refund to the browser of the mobile phone, and sends thereto the money for the refund (1313). The amount of the refund of the contents fee is calculated considering the contents usage condition data. Here, as the amount of the refund, a fixed amount of refund preset in the contents seller management server may be used. It is also possible to set the amount of refund of the contents as required in accordance with variation in the value of contents. The amount of refund of the contents may be sent through the network and the method of sending the amount of refund is never limited to the particular method. Furthermore, it is possible to give the user a credit towards the purchase of other contents from the seller management server in the amount of the refund fee of the contents.

Figures 14, 15A, 15B:
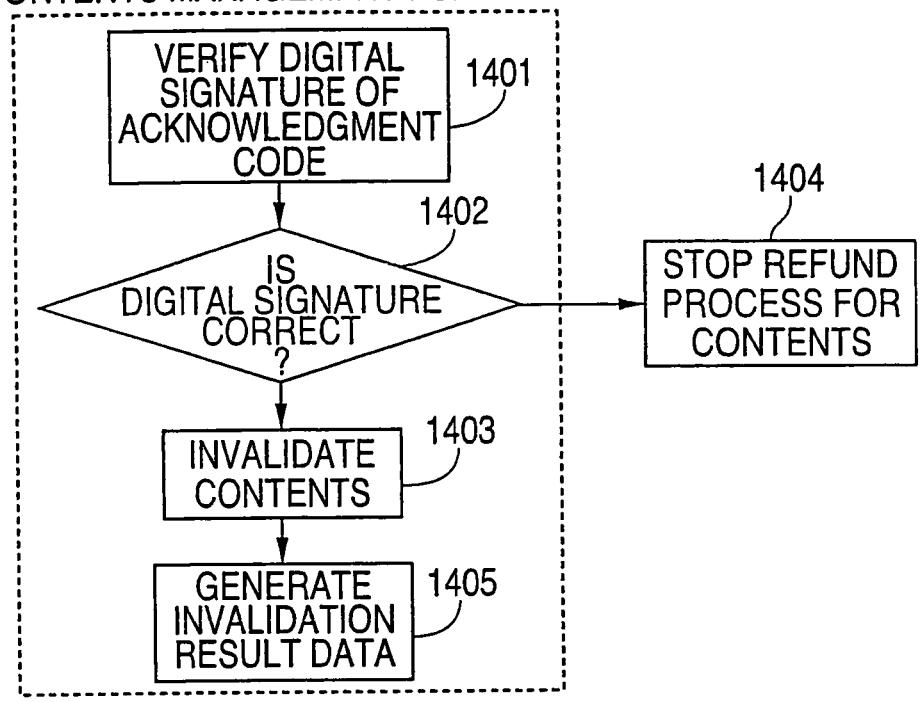
FIG. 14 is a detailed flowchart of the contents management function in accordance with an exemplary embodiment of the invention.
FIGS. 15(a) and 15(b) are diagrams illustrating an acknowledgment code and invalidation result data in accordance with an exemplary embodiment of the invention.

FIG. 14 is a detailed flowchart of the contents management function of a mobile phone in relation to the refund of the fee for the contents in accordance with an exemplary embodiment of the invention. The contents management function of the mobile phone receives the acknowledgment code from the contents seller management server and verifies whether the digital signature of the acknowledgment code is correct or not (1401). Here, the digital signature is judged correct when a digital signature is judged by the contents seller management server as the signature for acknowledging the desired refund of the contents. When the digital signature verified is correct, invalidation of the contents is executed (1402, 1403). If the digital signature verified is judged to be not correct, the refund process of the contents is stopped (1404). Otherwise, it is also possible to request re-transmission of the acknowledgment code to the contents seller management server. After completion of invalidation of the contents, the invalidation result data indicating that the contents have been invalidated is generated (1405).

The acknowledgment code and invalidation result code illustrated in FIG. 15(*a*) and FIG. 15(*b*) are never limited thereto and the data using other formats to guarantee the refund of the contents, may also be used. Moreover, the right to use the contents may be administered so that the right is included in the contents and is administered with the contents, the right is administered within the mobile phone separately from the contents, and the right is administered in a usage right management server connected to the network.

In the case of the second method described above, the right is invalidated with the contents management function. When the right to use is administered in the usage right management server, the right may be invalidated by requesting the invalidation of the right to use the usage right management server with the invalidation notifying function. Moreover, an application is also possible where the contents are purchased again, in addition to the refund of the contents.

According to this mobile phone, the contents seller management server is capable of verifying, from the invalidation result data, that the contents are invalidated in the mobile phone. Therefore, refund of the contents through the network becomes possible and convenience in distribution of contents can be improved.

In the above embodiment, transfer of the contents has been attempted among the mobile phones, but the present invention is not limited thereto and allows transfer of contents or the like with other information processors which can provide a contents transfer function or the like.

In above embodiment, contents are stored in a flash memory, but the present invention is not limited thereto, and contents may be stored in another type of storage device or an external storage device connected to the information processor.

In the above embodiment, a random number is used for the letter of credit but the present invention is not limited thereto, but instead the random number may be omitted from the letter of credit or the like.

The many features and advantages of the invention are apparent from the detailed specification and, thus, it is intended by the appended claims to cover all such features and advantages of the invention that fall within the true spirit and scope of the invention which is defined in the claims. Further, since numerous modifications and changes will readily occur to those skilled in the art, it is not desired to limit the invention to the exact construction and operation illustrated and described, and accordingly all suitable modifications and equivalents may be resorted to, falling within the scope of the invention which is defined in the claims and their equivalents.

What is claimed is:

1. An information processing apparatus comprising:
a storage configured to store electronic information; and
a processor coupled to the storage and configured to:
generate an encrypted electronic information by encrypting the electronic information with a public key, which is received from another information processing apparatus,
erase the electronic information from the storage,
generate an electronic letter of credit which indicates that the electronic information has been erased and the encrypted electronic information has been generated, and
transmit the encrypted electronic information and the electronic letter of credit to the another information processing apparatus only after erasing the electronic information from the storage.

2. The information processing apparatus according to claim 1, wherein the electronic letter of credit generated by the processor is given a digital signature of a user transmitting the encrypted electronic information.

3. The information processing apparatus according to claim 1, wherein the electronic letter of credit generated by the processor is given an attribute list of the encrypted electronic information to be transmitted to the another information processing apparatus.

4. The information processing apparatus according to claim 1, wherein the electronic information before encryption is erased after completion of the generating the encrypted electronic information, and the encrypted electronic information is left in the storage until the encrypted electronic information is transmitted by the processor.

5. The information processing apparatus according to claim 1, wherein the electronic information includes contents information indicating an attribute of the electronic information.

6. The information processing apparatus according to claim 1, wherein the processor is configured to auction off the electronic information via networks.

7. The information processing apparatus according to claim 1, wherein the processor is configured to transmit the encrypted electronic information to said another information processing apparatus after receiving a transfer processing continuation message from said another information processing apparatus.

8. A storage medium storing a program to be executed, by a computer, execution of the program causing the computer to perform a process comprising:
generating an encrypted electronic information by encrypting electronic information with a public key which is received from another information processing apparatus, the electronic information being stored in a storage;
erasing the electronic information from the storage;
generating an electronic letter of credit which indicates that the electronic information has been erased by the erasing and the encrypted electronic information has been generated by the generating; and
transmitting the encrypted electronic information and the electronic letter of credit to the another information processing apparatus only after erasing the electronic information from the storage.

9. A contents transfer method enabling transfer of electronic information via networks, comprising:
generating an encrypted electronic information by encrypting electronic information with a public key which is received from another information processing apparatus, the electronic information being stored in a storage;
erasing the electronic information from the storage;
generating an electronic letter of credit which indicates that the electronic information has been erased by the erasing and the encrypted electronic information has been generated by the generating; and
transmitting the encrypted electronic information and the electronic letter of credit to the another information processing apparatus only after erasing the electronic information from the storage by the erasing.

10. The contents transfer method according to claim 9, wherein the electronic letter of credit generated by the generating is given a digital signature of a user transmitting the encrypted electronic information.

11. The contents transfer method according to claim 9, wherein the electronic letter of credit generated by the generating is given an attribute list of the encrypted electronic information to be transmitted to the another information processing apparatus.

12. The contents transfer method according to claim 9, wherein the electronic information before encryption is erased after completion of the generating the encrypted electronic information, and the encrypted electronic information is left in the storage until the encrypted electronic information is transmitted by the transmitting.

13. The contents transfer method according to claim 9, wherein the electronic information includes contents information indicating an attribute of the electronic information.

14. The contents transfer method according to claim 9, further comprising:
auctioning off the electronic information via networks.

15. The contents transfer method according to claim 9, wherein the transmitting transmits the encrypted electronic information to the another information processing apparatus after receiving a transfer processing continuation message from the another information processing apparatus.

* * * * *